United States Patent
Ong et al.

(12)

(10) Patent No.: US 12,056,646 B1
(45) Date of Patent: Aug. 6, 2024

(54) MODIFYING DIRECTIVE-BASED TRANSPORTATION DISPATCH MODELS BASED ON DIGITAL CRITICAL SITUATION SIMULATIONS

(71) Applicant: Lyft, Inc., San Francisco, CA (US)

(72) Inventors: Hao Yi Ong, San Francisco, CA (US); Davide Crapis, San Francisco, CA (US); Su Wang, Burlingame, CA (US); Kevin Hsing-Chiang Fan, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 425 days.

(21) Appl. No.: 17/069,276

(22) Filed: Oct. 13, 2020

(51) Int. Cl.
| | |
|---|---|
| *G06Q 10/0637* | (2023.01) |
| *G06F 16/28* | (2019.01) |
| *G06F 30/20* | (2020.01) |
| *G06Q 10/0635* | (2023.01) |
| *G06Q 10/0639* | (2023.01) |
| *G06Q 50/40* | (2024.01) |
| *G06F 111/08* | (2020.01) |
| *G06Q 10/067* | (2023.01) |
| *G06Q 30/0204* | (2023.01) |

(52) U.S. Cl.
CPC ..... *G06Q 10/06375* (2013.01); *G06F 16/285* (2019.01); *G06F 30/20* (2020.01); *G06Q 10/0635* (2013.01); *G06Q 10/06393* (2013.01); *G06Q 50/40* (2024.01); *G06F 2111/08* (2020.01); *G06Q 10/067* (2013.01); *G06Q 30/0204* (2013.01)

(58) Field of Classification Search
CPC ......... G06Q 10/06375; G06Q 10/0635; G06Q 10/06393; G06Q 10/067; G06Q 30/0204; G06Q 50/30; G06F 16/285; G06F 30/20; G06F 2111/08

USPC ....................................................... 705/7.28
See application file for complete search history.

(56) References Cited

U.S. PATENT DOCUMENTS

| | | | | |
|---|---|---|---|---|
| 2013/0238181 A1* | 9/2013 | James | ............... | B60W 50/0097 701/23 |
| 2018/0340790 A1* | 11/2018 | Kislovskiy | ......... | G01C 21/3484 |
| 2018/0341261 A1* | 11/2018 | Kislovskiy | ............. | G06N 20/00 |

(Continued)

OTHER PUBLICATIONS

Al-Najada, Real-Time Traffic Incidents Prediction in Vehicular Networks Using Big Data Analytics Doctoral dissertation, Florida Atlantic University (2018) (Year: 2018).*

(Continued)

*Primary Examiner* — Charles Guiliano
(74) *Attorney, Agent, or Firm* — Keller Preece PLLC

(57) ABSTRACT

The present disclosure relates to systems, methods, and non-transitory computer-readable media that validate the performance of a dispatch model, such as a directive-based model, utilized for facilitating transportation matching services. For example, the disclosed systems can generate critical situations clusters composed of groups of critical transportation provider performance scenarios. From the critical situation clusters, the disclosed systems can sample one or more critical transportation provider situations that present a risk of degradation for the transportation matching services. Accordingly, the disclosed systems can measure a performance of the dispatch model by employing a simulation model that utilizes the dispatch model to propagate the critical transportation provider situations through time.

20 Claims, 11 Drawing Sheets

(56) References Cited

U.S. PATENT DOCUMENTS

| | | | | |
|---|---|---|---|---|
| 2018/0341888 A1* | 11/2018 | Kislovskiy | ....... | G08G 1/096838 |
| 2018/0341895 A1* | 11/2018 | Kislovskiy | ....... | G06Q 10/06313 |
| 2018/0342033 A1* | 11/2018 | Kislovskiy | ......... | G01C 21/3697 |
| 2020/0074024 A1* | 3/2020 | Levinson | ............. | G05D 1/0088 |
| 2020/0156243 A1* | 5/2020 | Ghare | .................... | G06N 20/00 |

OTHER PUBLICATIONS

Corso, Anthony et al.; "A Survey of Algorithms for Black-Box Safety Validation"; May 6, 2020; Cornell University; https://arxiv.org/pdf/2005.02979v1.pdf.

Ulbrich, Simon et al.; "Defining and Substantiating the Terms Scene, Situation, and Scenario for Automated Driving"; Published 2015 Engineering, Computer Science 2015 IEEE 18th International Conference on Intelligent Transportation Systems.

Wikipedia: The Free Encyclopedia; "ISO 26262"; Date downloaded Oct. 28, 2020; https://en.wikipedia.org/wiki/ISO_26262.

Scwartz, Peter; The Art of the Long View: Planning for the Future in an Uncertain World; Published by Currency; Apr. 15, 1996; 288 Pages; https://www.penguinrandomhouse.com/books/162919/the-art-of-the-long-view-by-peter-schwartz/.

Tim Allan Wheeler; Automotive Safety Validation in Simulation a Dissertation Submitted to the Department of Aeronautics and Astronauticsand the Committee on Graduate Studies of Stanford University in Partial Fulfillment of the Requirements for the Degree of Doctor of Philosophy; Jan. 2018.

T. A. Wheeler and M. J. Kochenderfer, "Critical Factor Graph Situation Clusters for Accelerated Automotive Safety Validation," 2019 IEEE Intelligent Vehicles Symposium (IV), Paris, France, 2019, pp. 2133-2139, doi: 10.1109/IVS.2019.8813845.

* cited by examiner

MODIFYING DIRECTIVE-BASED TRANSPORTATION DISPATCH MODELS BASED ON DIGITAL CRITICAL SITUATION SIMULATIONS

BACKGROUND

Recent years have seen significant advancement in hardware and software platforms for analyzing and modifying various computer-implemented models. In particular, in many instances, validation systems are utilized to simulate and measure the performance of a given model to improve understanding of how the model will perform under real-world conditions and/or to identify components or parameters of the model that need adjustment. Indeed, validation systems can be utilized to confirm desirable performance of a model or to discover undesirable behavior or conditions that cause the model to perform inadequately. By validating models in this way, administrators can prepare their models for launch and modify models to improve performance.

SUMMARY

One or more embodiments described herein provide benefits and/or solve one or more of the foregoing or other problems in the art with systems, methods, and non-transitory computer-readable media that that validate and/or modify directive-based transportation dispatch models based on digital critical situation simulations. To illustrate, in one or more embodiments, the disclosed systems identify scenarios that correspond to rare, critical events that can drive the risk of transportation matching services degradation. The disclosed systems can simulate transportation matching services within a simulated environment using the dispatch model based on samples from these scenarios and modify hyperparameters of the dispatch model based on a determined performance. In this manner, the disclosed systems can efficiently validate performance of the dispatch model without simulating the breadth of possible scenarios while accurately capturing the performance under various possible conditions, including those potentially detrimental to providing transportation matching services.

Additional features and advantages of one or more embodiments of the present disclosure are outlined in the following description.

BRIEF DESCRIPTION OF THE DRAWINGS

This disclosure will describe one or more embodiments with additional specificity and detail by referencing the accompanying figures. The following paragraphs briefly describe those figures, in which.

DETAILED DESCRIPTION

Figure 1:
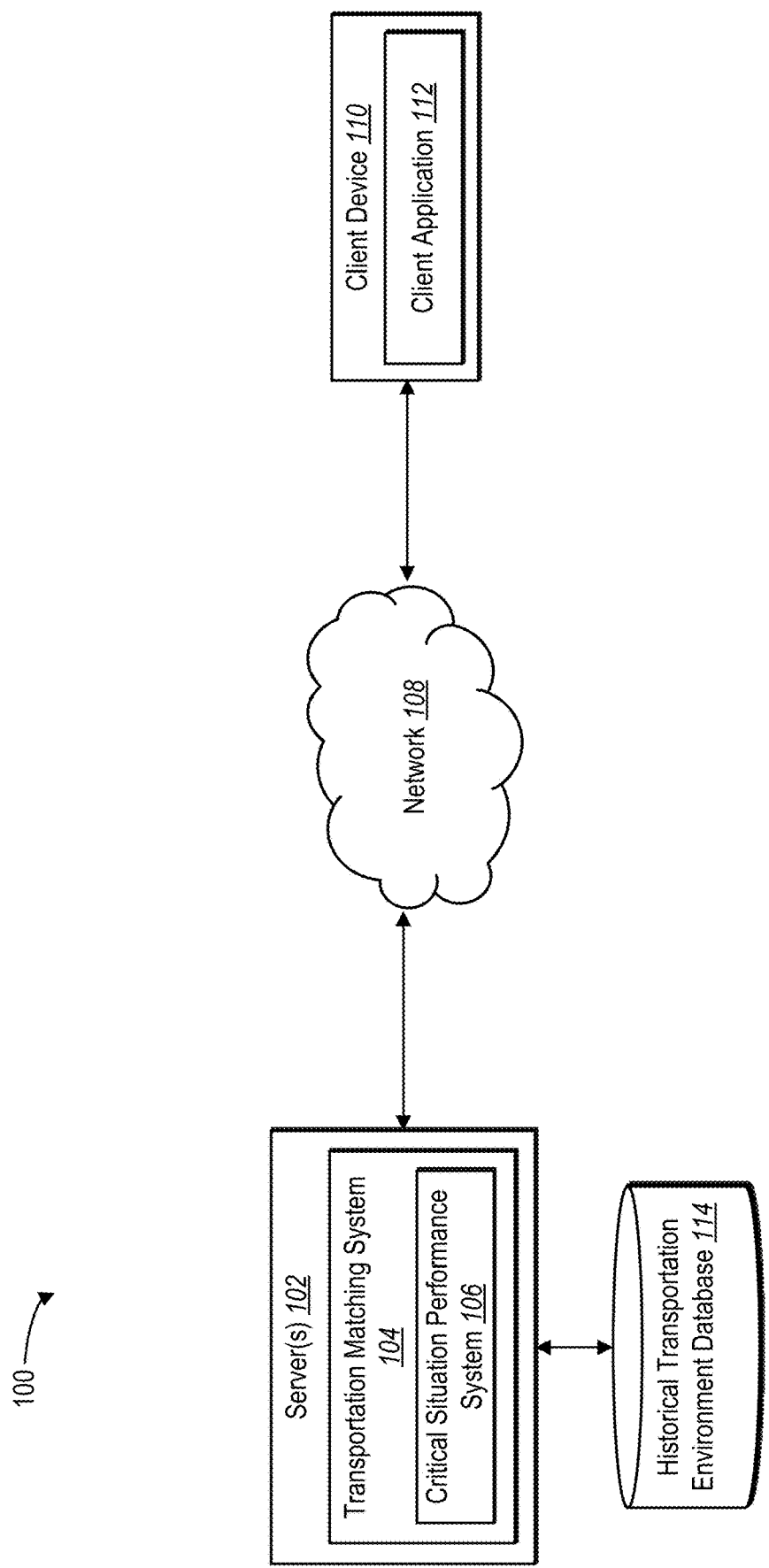
FIG. 1 illustrates an example environment in which a critical situation performance system can operate in accordance with one or more embodiments.

One or more embodiments described herein include a critical situation performance system that can efficiently and accurately measure the performance of a dispatch model used for transportation matching services and/or modify parameters of the dispatch model based on digital critical situation simulations. For example, the critical situation performance system can perform accelerated validation of a dispatch model using clusters that correspond to critical situations having conditions that increase the risk of degradation of the transportation matching services. The critical situation performance system can sample critical situations from these clusters and use the samples to simulate transportation matching services within a simulated environment using the dispatch model. Based on the simulations, the critical situation performance system can generate metrics that are indicative of the performance of the dispatch model. In some implementations, the critical situation performance system utilizes a different model (e.g., different than the dispatch model to be measured) to generate the clusters in order to more efficiently identify critical situations. Thus, the critical situation performance system can improve validation of the performance of a dispatch model on critical situations that have the potential to degrade the effectiveness of transportation matching services within an environment. In addition, the critical situation performance system can modify hyperparameters of the dispatch model based on the measured performance to improve dispatch efficiency and accuracy.

To provide an illustration, in one or more embodiments, the critical situation performance system simulates a set of initialized transportation provider situations propagated through time to determine risk metrics corresponding to the set of initialized transportation provider situations. Further, the critical situation performance system determines critical transportation provider performance scenarios by comparing the risk metrics corresponding to the set of initialized transportation provider situations to a risk threshold. Using a clustering algorithm, the critical situation performance system can group the critical transportation provider performance scenarios into critical situation clusters and sample a critical transportation provider situation from the critical situation clusters. The critical situation performance system can utilize a simulation model to generate one or more performance metrics for the critical transportation provider situation by propagating the critical transportation provider situation through time.

As just mentioned, in one or more embodiments, the critical situation performance system determines critical transportation provider performance scenarios based on simulating a set of initialized transportation provider situations propagated through time. For example, the critical situation performance system generates initialized transportation provider situations using distributions of data that reflect real-world environments (e.g., an environment distribution, a behavior distribution, etc.). In some implementations, the critical situation performance system generates at least some of the distributions using historical data.

The critical situation performance system can further propagate the initialized transportation provider situations through time. In particular, the critical situation performance system can utilize a simulation model to generate simulations by propagating the initialized transportation provider situations through time. For example, the critical situation performance system can utilize the simulation model to make changes to the simulated environment and implement the behavior of the corresponding agents-such as simulated transportation providers and simulated transportation requesters-across time. In some implementations, the simulation model utilizes a dispatch model, such as a random walk model, to at least partially direct the behavior of the simulated transportation providers within the simulated environment, though various other dispatch models can be utilized.

Additionally, the critical situation performance system can determine one or more critical transportation provider performance scenarios based on the simulations generated from the initialized transportation provider situations. For example, by generating the simulations, the critical situation performance system can determine risk metrics that correspond to the initialized transportation provider situations. The critical situation performance system can compare the risk metric(s) for a simulation generated by propagating a given initialized transportation provider situation through time to a risk threshold to determine whether the simulation reflects a critical transportation provider performance scenario. In some embodiments, the critical situation performance system identifies, as a critical transportation provider performance scenario, a portion of a simulation that occurs before a risk metric corresponding to the simulation crosses the risk threshold.

As further mentioned above, in one or more embodiments, the critical situation performance system groups the determined critical transportation provider performance scenarios. In particular, the critical situation performance system can group the determined critical transportation provider performance scenarios into critical situation clusters by, for example, utilizing a clustering algorithm. To illustrate, in one or more embodiments, the critical situation performance system utilizes a clustering algorithm to generate the critical situation clusters based on simulated environment condition features associated with the determined critical transportation provider performance scenarios.

Additionally, as mentioned above, in one or more embodiments, the critical situation performance system utilizes a simulation model to generate one or more performance metrics for a critical transportation provider situation from the critical situation clusters. Indeed, the critical situation performance system can sample a critical transportation provider situation from the critical situation clusters and utilize the simulation model to propagate the sampled critical transportation provider situation through time. In other words, the critical situation performance system can utilize the simulation model to generate a simulation based on the sampled critical transportation provider situation. In one or more embodiments, the simulation model utilized to propagate the sampled critical transportation provider situation through time is different than the simulation model utilized to simulate the initialized transportation provider situations. For example, in some implementations, the simulation model utilized to propagate the sampled critical transportation provider situation through time employs, as the dispatch model, a directive-based model to at least partially direct the behavior of the simulated transportation providers within the simulated environment.

In some embodiments, the critical situation performance system utilizes the directive-based model with the aim to test the performance of the directive-based model for real-world application. For example, the critical situation performance system can further determine one or more performance metrics for the critical transportation provider situation. For example, the performance metric(s) can indicate a measure of performance for the directive-based model in directing the behavior of the simulated transportation providers to facilitate transportation matching services as the critical transportation provider situation is propagated through time. In some embodiments, the critical situation performance system provides the performance metric(s) for display on a computing device (e.g., as part of a graph or report). In some implementations, the critical situation performance system modifies hyperparameters of the directive-based model based on the performance metric(s).

As mentioned above, conventional validation systems often suffer from several technological shortcomings that result in efficient and inaccurate behavior. For example, many conventional validation systems are inefficient in that they attempt to validate a model by simulating performance of the model for every conceivable combination of real-world conditions. Indeed, such conventional systems often employ a brute force approach to measure performance of a model across the breadth of possible condition sets. Such an approach typically requires significant amounts of computing resources (e.g., memory, processing power, and processing time) to fully validate a model's performance. Conventional systems can suffer from further inefficiencies due to the requirements for viewing performance metrics and making changes to the models accordingly. Indeed, conventional systems can require significant user interaction, time, and corresponding computer resources to analyze the performance of a model, identify the corresponding performance metrics, and make any changes to the model based on those metrics.

In addition to efficiency concerns, conventional validation systems can also operate inaccurately. Indeed, in some cases, to avoid the inefficiencies of brute-force validation, conventional systems simulate model performance on sets of conditions sampled from the breadth of possible condition sets. For example, conventional systems may randomly sample from the possible condition sets. Such an approach, however, often fails to select rare sets of conditions in which performance of the model is most likely to degrade, and instead places an emphasis on simulating performance on sets of conditions that are generally considered benign. Thus, such conventional systems often fail to provide an accurate analysis of model performance under various possible conditions, including those potentially harmful to performance.

The critical situation performance system provides several advantages over conventional systems. For example, the critical situation performance system introduces an unconventional approach to validating a model, such as a directive-based model used to direct the behavior of transportation providers through time. Indeed, the critical situation performance system utilizes an unconventional ordered combination of actions for determining the performance of the directive-based model by determining critical situation clusters based on identified critical transportation provider performance scenarios and generating simulations using samples from the critical situation clusters. Because models that perform well in critical situations likely also perform well in benign situations, the critical situation performance system can thus determine performance of the directive-based model under various possible conditions, including those potentially harmful to the provision of transportation matching services.

Additionally, the critical situation performance system can operate more efficiently than conventional systems. Indeed, by generating performance metrics based on simulations generated by propagating sampled critical transportation provider situations through time, the critical situation performance system avoids the need for a brute-force approach that generates simulations for every conceivable combination of conditions. Thus, the critical situation performance system reduces the computing resources (e.g., memory, processing power, and processing time) needed to validate performance of the directive-based model. In addition, the critical situation performance system can improve efficiency by providing user interfaces for visualizing the performance of the directive-based model and/or modifying the hyperparameters of the directive-based model.

Further, the critical situation performance system can improve accuracy. Indeed, by generating performance metrics for critical transportation provider situations propagated through time, the critical situation performance system can ensure that rare but potentially degrading conditions are incorporated into the validation. Thus, the critical situation performance system can provide a more accurate analysis of model performance under various possible conditions.

As illustrated by the foregoing discussion, the present disclosure utilizes a variety of terms to describe features and benefits of the critical situation performance system. Additional detail is now provided regarding the meaning of these terms. For example, as used herein, the term "simulated environment" refers to a computer-generated or modeled environment or situation (e.g., leading to a modeled series of events). In particular, a simulated environment can include a computer-generated environment in which a simulation is implemented. For example, a simulated environment can include a computer-generated environment within which simulated transportation providers and simulated transportation requesters can move about via simulation. A simulated environment can include a unique environment or a replication of a real-world location (e.g., a real-world metropolitan or rural area).

Additionally, as used herein, the term "degradation" refers to a failure of a transportation matching service to operate at a desired level of effectiveness. In particular, degradation can refer to a failure of one or more features or components of a transportation matching service (e.g., as implemented by a transportation matching system) to operate at a determined minimum-acceptable level of effectiveness. For example, degradation can include, but is not limited to, circumstances where a transportation matching service is experiencing low or excessive off-trip utilization, low or excessive in-ride utilization, or elevated estimated time-to-arrivals (ETAs). Degradation can include a failure of a transportation matching service in a real-world application but can also refer to a failure in a simulated environment. Indeed, in one or more embodiments, the critical situation performance system utilizes a simulated environment to identify conditions in which degradation can occur without experiencing degradation in a real-world application.

Additionally, as used herein, the term "risk" refers to a potential degradation of transportation matching services. In particular, risk can refer to a probability of occurrence of degradation. Risk can also refer to a severity of degradation. For example, in some implementations, risk includes a combination of the probability of occurrence of degradation and the severity of the degradation. In some instances, risk includes the aggregate risk over all forms of identifiable degradation. Relatedly, as used herein, the term "risk metric" refers to a value or measure indicative of a risk. In particular, a risk metric can refer to a numerical value providing a quantitative indication of a level of risk. Further, used herein, the term "risk threshold" refers to a particular level of risk.

As used herein, the term "simulated transportation provider" refers to a computer-generated representation of a transportation provider that can be used for simulation. In particular, a simulated transportation provider can refer to a computer-generated representation of a transportation provider that moves (or doesn't move) within a simulated environment during a simulation. In some implementations, a simulated transportation provider moves (or doesn't move) within a simulated environment based on events that occur during the simulation, conditions of the simulated environment, behavioral parameters associated with the simulated transportation provider, and/or various other factors.

Additionally, as used herein, the term "behavior" refers to the one or more actions (of a simulated transportation provider, simulated transportation requestor, or other actor) during a simulation (e.g., locations within the simulated environment at which the simulated transportation provider positions itself). In one or more embodiments, a behavior of a simulated transportation provider is at least partially directed by one or more parameters. In some implementations, a behavior of a simulated transportation provider is at least partially directed by a dispatch model. In some embodiments, a parameter for a behavior of a simulated transportation provider can reflect an adherence to a dispatch model.

Further, as used herein, the term "directive-based model" refers to a computer-implemented model that, at least partially, directs the actions of transportation providers using one or more directives. In particular, a directive-based model can refer to a dispatch model that is implemented by a computer and provides one or more directives to a transportation provider during, indicating a position within (or outside) an environment at which the transportation provider is to position itself. For example, a directive-based model can provide a transportation provider with a directive to remain within a current position or to reposition itself to a new location within the environment. The critical situation performance system can utilize the directive-based model to at least partially direct the behavior of simulated transportation providers within a simulated environment.

As used herein, the term "scene" refers to a state of a simulated environment. In particular, a scene can refer to a snapshot of the state of a simulated environment at a particular point in time (e.g., before, during, or after a simulation implemented within the simulated environment). For example, a scene can include conditions of a simulated environment, a positioning of simulated transportation providers within a simulated environment, and/or a positioning of simulated transportation requesters within a simulated environment.

Additionally, as used herein, the term "transportation provider situation" refers to a scene that has been augmented with parameters. For example, a transportation provider situation can include a scene that has been modified so that one or more simulated transportation providers included therein have been associated with one or more parameters for behavior. Relatedly, as used herein, the term "initialized transportation provider situation" refers to a transportation provider situation that has been initialized for simulation. For example, an initialized transportation provider situation can include a transportation provider situation that has been associated with initial parameters or has otherwise been generated for use as an initial transportation provider situation within a simulation. Further, as used herein, the term "critical transportation provider situation" refers to a transportation provider situation associated with a particular level of risk of degradation (e.g., there is a particular level of risk that degradation will occur if the transportation provider situation is propagated through time). For example, a critical transportation provider situation can include a transportation provider situation having a level of risk as indicated by a risk metric that at least meets a risk threshold.

As used herein, the term "transportation provider performance scenario" refers to a transportation provider situation that has been propagated through time. In particular, a transportation provider performance scenario can refer to a simulation (or a portion of a simulation) that has been generated based on a transportation provider situation. A transportation provider performance scenario can include the evolution of a simulated environment based on the actions of simulated transportation providers, the actions of simulated transportation requesters, and/or various other factors as a transportation provider situation is propagated through time. Indeed, a transportation provider performance scenario can include a sequence of transportation provider situations. Relatedly, as used herein, the term "critical transportation provider performance scenario" refers to a transportation provider performance scenario associated with a particular level of risk of degradation. Indeed, as mentioned, a transportation provider performance scenario can include a sequence of critical transportation provider situations. Accordingly, a transportation provider performance scenario can be associated with one or more risk metrics that correspond to the encompassed critical transportation provider situations. In some implementations, the critical situation performance system identifies a transportation provider performance scenario as a critical transportation provider performance scenario based on the risk metric of at least one of the encompassed critical transportation provider situations meeting or exceeding a risk threshold.

Additionally, as used herein, the term "critical situation cluster" refers to a group of one or more critical transportation provider performance scenarios. Accordingly, a critical situation cluster includes critical transportation provider situations corresponding to the one or more grouped critical transportation provider performance scenarios.

Relatedly, as used herein, the term "clustering algorithm" refers to a computer-implemented model or algorithm that generates one or more clusters (e.g., critical situation clusters). In particular, a clustering algorithm can refer to a computer-implemented algorithm that groups critical transportation provider performance scenarios into one or more critical situation clusters (e.g., based on features associated with the critical transportation provider performance scenarios). For example, a clustering algorithm can include, but is not limited to, a k-means clustering algorithm, a mean-shift clustering algorithm, an expectation-maximization clustering algorithm, or an agglomerative hierarchical clustering algorithm.

As used herein, the term "simulation model" refers to a computer-implemented model for generating simulations. In particular, a simulation model can refer to a computer-implemented model that can propagate a transportation provider situation through time to generate a simulation (e.g., to generate a transportation provider performance scenario).

Additionally, as used herein, the term "performance metric" refers to a value that is indicative of a performance of a computer-implemented model, such as a directive-based model. In particular, a performance metric can refer to a numerical value that is indicative of the quality of some performance feature associated with a computer-implemented model within a simulation. For example, a performance metric can include, but is not limited to, a transportation utilization metric or a transportation throughput metric. As used herein, the term "transportation utilization metric" refers to the amount of transportation matching services rendered during a simulation. For example, a transportation utilization metric can include the number of simulated rides provided by simulated transportation providers or the number of simulated transportation requesters serviced during a simulation. As used herein, the term "transportation throughput metric" refers to a rate of transportation matching services rendered during simulation. For example, a transportation throughput metric can include an average rate of rides provided (or transportation requesters serviced) or a peak rate of rides provided (or transportation requesters serviced) during a simulation.

As used herein, the term "simulated environment degradation event" refers to an event occurring during a simulation that indicates degradation. For example, a simulated environment degradation event can include the occurrence of low utilization of simulated transportation providers to provide transportation despite high demand.

As used herein, the term "simulated environment condition feature" refers to a characteristic or trait of a transportation provider performance scenario (e.g., of at least a portion of a transportation provider situation, such as an initialized transportation provider situation, propagated through time). For example, a simulated environment condition feature can include off-trip utilization, in-ride utilization, price distribution statistics, ETA distribution statistics, demand count, or supply counts.

Additional detail regarding the critical situation performance system will now be provided with reference to the figures. For example, FIG. 1 illustrates a schematic diagram of an exemplary system environment ("environment") 100 in which a critical situation performance system 106 can be implemented. As illustrated in FIG. 1, the environment 100 includes a server(s) 102, a network 108, a client device 110, and a historical transportation environment database 114.

Although the environment 100 of FIG. 1 is depicted as having a particular number of components, the environment 100 can have any number of additional or alternative components (e.g., any number of servers, client devices, historical transportation environment databases, or other components in communication with the critical situation performance system 106 via the network 108). Similarly, although FIG. 1 illustrates a particular arrangement of the server(s) 102, the network 108, the client device 110, and the historical transportation environment database 114, various additional arrangements are possible.

The server(s) 102, the network 108, the client device 110 and the historical transportation environment database 114 may be communicatively coupled with each other either directly or indirectly (e.g., through the network 108 discussed in greater detail below in relation to FIG. 10). Moreover, the server(s) 102 and the client device 110 may include a variety of computing devices (including one or more computing devices as discussed in greater detail with relation to FIG. 10).

As mentioned above, the environment 100 includes the server(s) 102. The server(s) 102 can generate, store, retrieve, and/or transmit digital data, including performance metrics that indicate a performance of a computer-implemented model, such as a directive-based model. For example, the server(s) 102 can retrieve historical transportation environment data (e.g., from the historical transportation environment database 114) and transmit one or more performance metrics generated using the historical transportation environment data to a client device (e.g., the client device 110). In one or more embodiments, the server(s) 102 comprises a data server. The server(s) 102 can also comprise a communication server or a web-hosting server.

As shown in FIG. 1, the server(s) 102 includes a transportation matching system 104. In one or more embodiments, the transportation matching system 104 provides transportation matching services. In particular, the transportation matching system 104 matches transportation providers to transportation requests. For example, the transportation matching system 104 can receive a transportation request from a computing device (e.g., a requestor device) associated with a transportation requester. The transportation matching system 104 can further identify a transportation provider available to accept the transportation request. In some embodiments, the transportation provider/provider devices are automated vehicles (e.g., without a human operator within the vehicle). In such circumstances, the transportation matching system 104 can dispatch and control the transportation provider through the logic of the automated vehicle. Accordingly, the transportation matching system 104 can transmit the transportation request to a computing device associated with the transportation provider (e.g., a provider device). In some implementations, the transportation matching system 104 implements a model, such as a directive-based model, to provide directives to provider devices in order to position the transportation providers/provider devices to receive transportation requests.

Additionally, the server(s) 102 include a critical situation performance system 106. In particular, in one or more embodiments, the critical situation performance system 106 utilizes the server(s) 102 to validate the performance of a computer-implemented model, such as a directive-based model that positions transportation providers/provider devices to receive transportation requests. In particular, the critical situation performance system 106 can utilize the server(s) 102 to generate performance metrics that indicate how the directive-based model performs based on propagating critical transportation provider situations through time.

To illustrate, in one or more embodiments, the critical situation performance system 106 (via the server(s) 102) simulates a set of initialized transportation provider situations propagated through time to determine risk metrics corresponding to the set of initialized transportation provider situations. The critical situation performance system 106, via the server(s) 102, further determines critical transportation provider performance scenarios by comparing the risk metrics corresponding to the set of initialized transportation provider situations to a risk threshold. Via the server(s) 102, the critical situation performance system 106 utilizes a clustering algorithm to group the critical transportation provider performance scenarios into critical situation clusters and further samples a critical transportation provider situation from the critical situation clusters. The critical situation performance system 106, via the server(s) 102, utilizes a simulation model to generate one or more performance metrics for the critical transportation provider situation by propagating the critical transportation provider situation through time.

In one or more embodiments, the historical transportation environment database 114 stores digital data related to the real-world provision of transportation services. For example, the historical transportation environment database 114 can store digital data that represents real-world locations, the states of those real-world locations at various times (e.g., including patterns of transportation needs), the availability of transportation providers to provider transportation, etc. Though FIG. 1 illustrates the historical transportation environment database 114 as a distinct component, one or more embodiments include the historical transportation environment database 114 as a component of the server(s) 102, the transportation matching system 104, or the critical situation performance system 106.

In one or more embodiments, the client device 110 includes a computing device that can receive digital data, such as digital data related to performance metrics associated with a computer-implemented model (e.g., a directive-based model). For example, the client device 110 can include a smartphone, a tablet, a desktop computer, a laptop computer, a head-mounted-display device, or other another electronic device. The client device 110 can include one or more applications (e.g., the client application 112) that can receive digital data, such as digital data related to performance metrics associated with a computer-implemented model (e.g., a directive-based model). For example, the client application 112 can include a software application installed on the client device 110. Additionally, or alternatively, the client application 112 can include a software application hosted on the server(s) 102, which may be accessed by the client device 110 through another application, such as a web browser.

The critical situation performance system 106 can be implemented in whole, or in part, by the individual elements of the environment 100. Indeed, although FIG. 1 illustrates the critical situation performance system 106 implemented with regard to the server(s) 102, different components of the critical situation performance system 106 can be implemented by a variety of devices within the environment 100. For example, one or more (or all) components of the critical situation performance system 106 can be implemented by a different computing device (e.g., the client device 110) or a separate server from the server(s) 102 hosting the transportation matching system 104. Example components of the critical situation performance system 106 will be described below with regard to FIG. 8.

Figure 2:
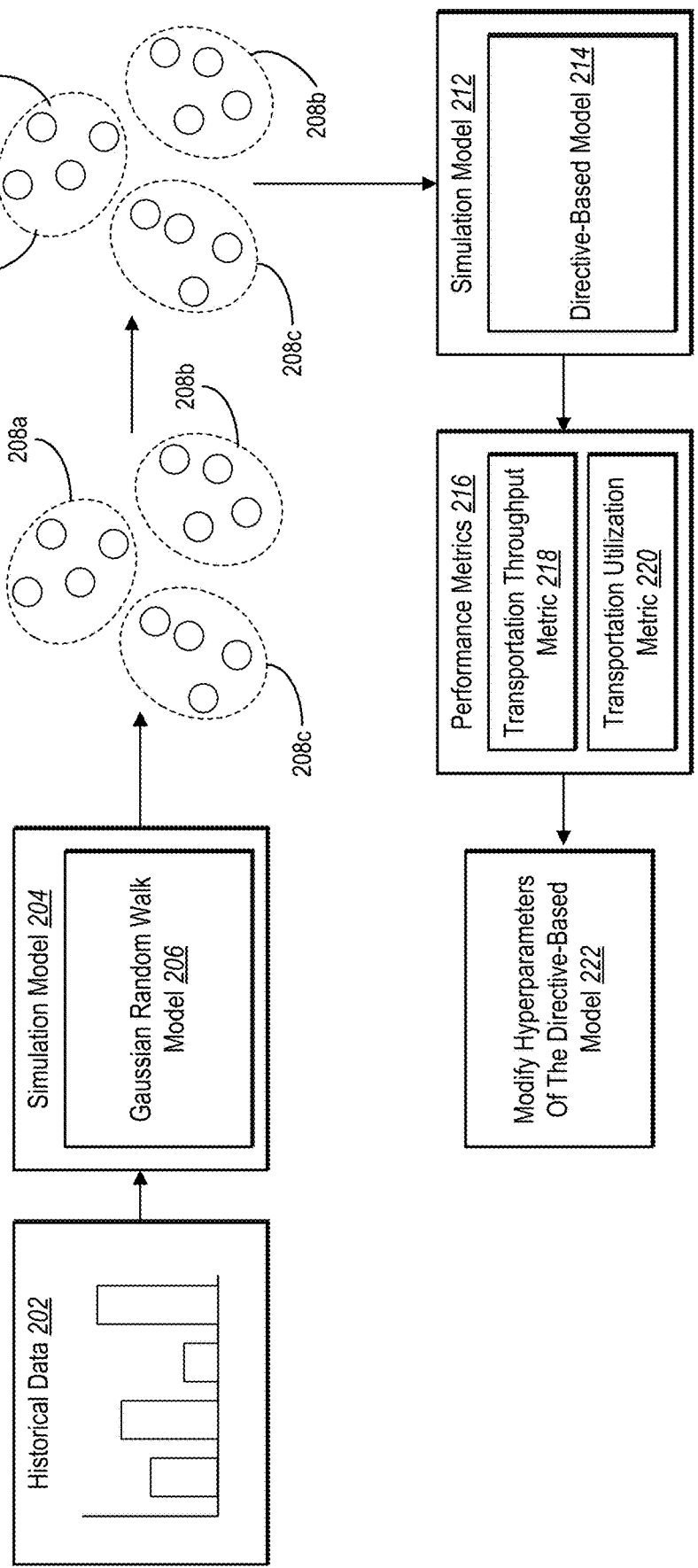
FIG. 2 illustrates a diagram of the critical situation performance system generating one or more performance metrics in accordance with one or more embodiments.

As mentioned above, the critical situation performance system 106 generates one or more performance metrics for a directive-based model that positions transportation providers to receive transportation requests. FIG. 2 illustrates a diagram of the critical situation performance system 106 generating one or more performance metrics in accordance with one or more embodiments.

As shown in FIG. 2, the critical situation performance system 106 provides historical data 202 to a simulation model 204. The historical data 202 can include data related to various aspects of transportation matching services. In particular, the historical data 202 can include digital data related to various aspects of transportation matching services previously implemented in a real-world environment. For example, the historical data 202 can include digital data related to real-world locations in which transportation matching services have been rendered, the states associated with those real-world locations at various points in time (e.g., including supply and demand statistics), transportation provider behavior patterns, etc. In some embodiments, the historical data additionally or alternatively includes data related to aspects of simulated transportation matching services, such as data extracted from previously generated simulations.

In some embodiments, the critical situation performance system 106 stores the historical data 202 (e.g., in a database) and accesses the historical data 202 for provision to the simulation model 204. In some implementations, the critical situation performance system 106 receives the historical data 202 from a third-party system or accesses the historical data 202 via third-party storage.

In one or more embodiments, as will be explained in more detail below, the critical situation performance system 106 generates one or more distributions of data based at least partially on the historical data 202. For example, in some implementations, the critical situation performance system 106 generates a situation distribution based at least partially on the historical data 202. The situation distribution can include various initialized transportation provider situations. Accordingly, the critical situation performance system 106 can sample a set of initialized transportation provider situations from the situation distribution and provide the sampled set to the simulation model 204.

In one or more embodiments, the critical situation performance system 106 utilizes the simulation model 204 to simulate the set of initialized transportation provider situations propagated through time (e.g., to generate transportation provider performance scenarios). Further, the critical situation performance system 106 can determine risk metrics corresponding to the set of initialized transportation provider situations. For example, the critical situation performance system 106 can determine a risk metric corresponding to each initialized transportation provider situation propagated through time (e.g., corresponding to each generated transportation provider performance scenario). Further, the critical situation performance system 106 can generate a risk profile for each initialized transportation provider situation propagated through time, where the risk profile reflects the value of the metric at each time step.

As shown in FIG. 2, the simulation model 204 includes a dispatch model to at least partially direct a behavior of a set of simulated transportation providers while propagating the set of initialized transportation provider situations through time. In particular, the simulation model 204 includes a Gaussian random walk model 206, though the simulation model 204 can include various other dispatch models, including various other random-walk-based models.

Further, as shown in FIG. 2, the critical situation performance system 106 generates critical situation clusters (e.g., the critical situation clusters 208a-208c). To illustrate, in one or more embodiments, the critical situation performance system 106 determines (e.g., identifies) critical transportation provider performance scenarios from the transportation provider performance scenarios generated by propagating the initialized transportation provider situations through time (e.g., based on their respective risk metrics). The critical situation performance system 106 can further group the determined critical transportation provider performance scenarios into the critical situation clusters. As shown in FIG. 2, the critical situation performance system 106 samples a critical transportation provider situation 210 from the critical situation clusters. Indeed, as a transportation provider performance scenario includes one or more transportation provider situations, each critical situation cluster can include multiple critical transportation provider situations.

Additionally, as illustrated in FIG. 2, the critical situation performance system 106 utilizes a simulation model 212 to propagate the critical transportation provider situation 210 through time. Further, as shown, the simulation model 212 utilizes a directive-based model 214 to at least partially direct a behavior of a set of simulated transportation providers while propagating the critical transportation provider situation 210 through time. By utilizing a different dispatch model (e.g., the Gaussian random walk model) to generate the critical transportation provider performance scenarios, the critical situation performance system 106 can efficiently identify critical transportation provider situations upon which to measure the performance of the directive-based model 214.

The critical situation performance system 106 can further determine performance metrics 216 based on propagating the critical transportation provider situation 210 through time. For example, as shown in FIG. 2, the critical situation performance system 106 can determine a transportation throughput metric 218 and a transportation utilization metric 220, though the critical situation performance system 106 can determine more or less performance metrics in various embodiments. Based on the performance metrics 216, the critical situation performance system 106 can modify hyperparameters of the directive-based model 214 (as shown by box 222). Accordingly, the critical situation performance system 106 can measure (and modify) the performance of the directive-based model in a simulated environment.

Figure 3:
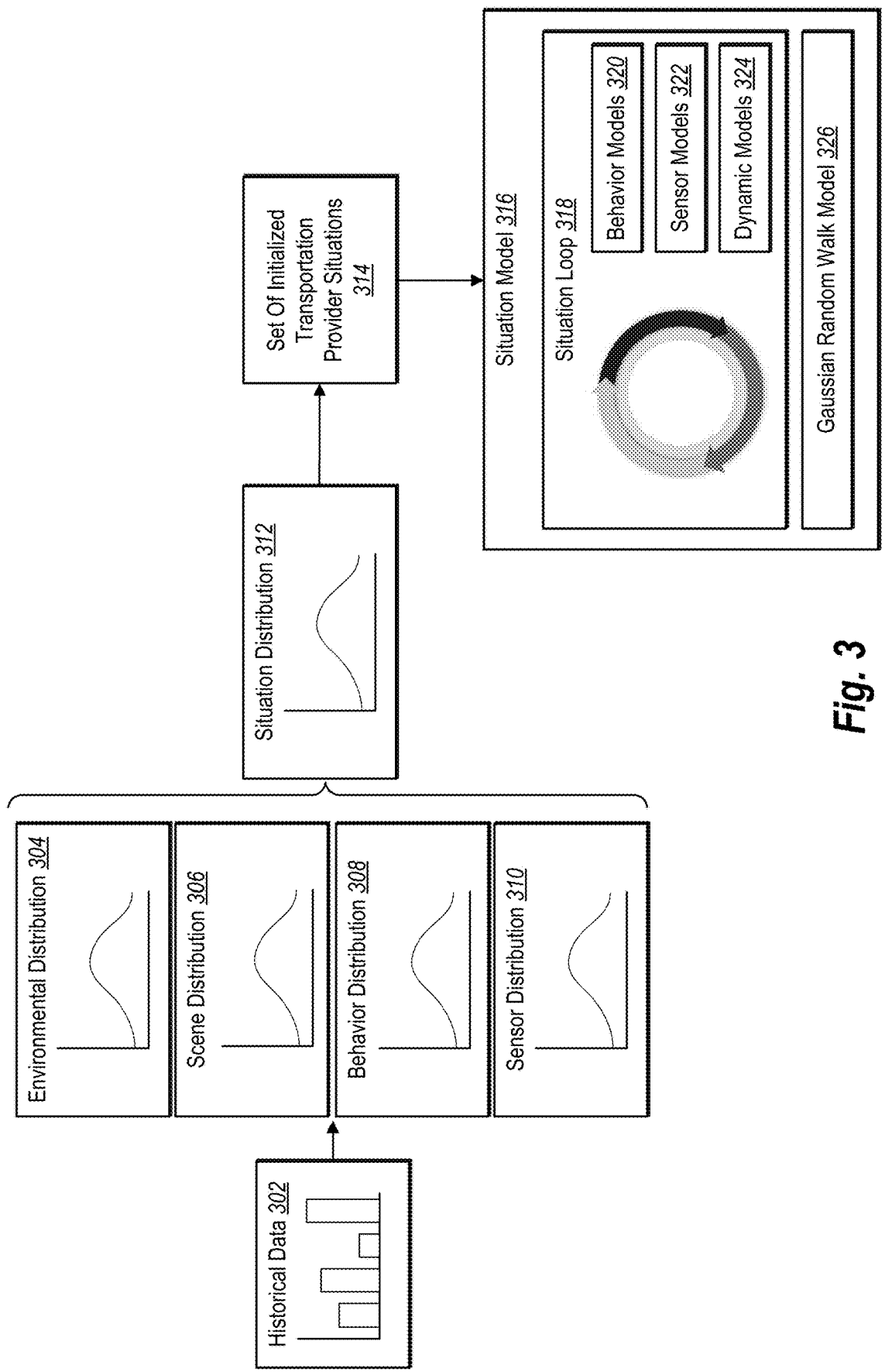
FIG. 3 illustrates a diagram for simulating a set of initialized transportation provider situations propagated through time in accordance with one or more embodiments.

As previously mentioned, the critical situation performance system 106 can simulate a set of initialized transportation provider situations propagated through time. FIG. 3 illustrates a diagram for simulating a set of initialized transportation provider situations propagated through time in accordance with one or more embodiments.

As shown in FIG. 3, the critical situation performance system 106 generates distributions of digital data. In particular, the critical situation performance system 106 generates the environment distribution 304, the scene distribution 306, the behavior distribution 308, and the sensor distribution 310. As shown, the critical situation performance system 106 can generate one or more of the distributions of digital data based on the historical data 302.

In one or more embodiments, the critical situation performance system 106 generates the environment distribution 304 to include a distribution of simulated environments. The simulated environments included in the environment distribution 304 can reflect real-world locations, such as real-world locations that transportation matching services are implemented. For example, the historical data 302 can include digital data associated with one or more real-world locations, and the critical situation performance system 106 can generate the simulated environments of the environment distribution 304 using this digital data.

In some implementations, the critical situation performance system 106 generates the simulated environments of the environment distribution 304 to reflect simplified versions of real-world locations. For example, the critical situation performance system 106 can generate the simulated environments without explicit road networks. Accordingly, the critical situation performance system 106 can determine information, such as ETA from one location to another within the simulated environment, based on the digital data from the historical data 302 that is associated with the corresponding real-world location.

In some embodiments, the critical situation performance system 106 generates various versions of simulated environments for the same real-world location. For example, the critical situation performance system 106 can generate a first version that reflects the real-world location before a particular real-world event (e.g., an event that temporarily changes the transportation matching needs of the real-world location) and a second version that reflects the real-world location during or after the real-world event.

In some embodiments, the critical situation performance system 106 generates the scene distribution 306 to include a distribution of scenes. For example, the critical situation performance system 106 can sample, from the historical data 302, frames or snapshots of the state of real-world locations corresponding to the simulated environments from the environment distribution 304 to generate the scene distribution 306. As indicated above, features of the scenes can include the positioning of the simulated transportation requesters and/or the positioning of the simulated transportation providers. In particular, the features can include the positioning of a simulated transportation provider in an open, off-trip, or in-ride state—where, respectively, the simulated transportation provider is not associated with a ride request, is traveling to pick up a simulated transportation requestor, or is traveling to drop off a simulated transportation requester. Further, for the simulated transportation providers, the critical situation performance system 106 can include, in the scenes, whether a given simulated transportation provider is available to accept a ride request even if the simulated transportation provider is not currently traveling to pick up or drop off a simulated transportation requestor.

Additionally, for a given scene, the critical situation performance system 106 can include a number of simulated transportation providers present in the scene based on the historical data 302. Further, the critical situation performance system 106 can associate, with the scene, changes to the number of simulated transportation providers present as the scene is propagated through time. For example, in one or more embodiments, the critical situation performance system 106 can utilize historical log-on and log-off times for transportation providers at the corresponding real-world location to determine how the number of simulated transportation providers will change as the scene is propagated through time. To simulate a simulated transportation provider "logging on," the critical situation performance system 106 can add the simulated transportation provider to the pool of present simulated transportation providers and make the simulated transportation provider available to accept transportation requests. In some implementations, to more accurately reflect utilization conditions, the critical situation performance system 106 can include fewer simulated transportation providers when appropriate, such as during periods of under-utilization during off-peak periods where additional simulated transportation providers are not permitted.

For simulated transportation requesters and rides, the critical situation performance system 106 can associate, with the scenes, times of departure from their origins and times of arrival at their destinations. Further, the critical situation performance system 106 can include the corresponding locations. In some embodiments, the critical situation performance system 106 extracts this information from the historical data 302.

In one or more embodiments, the critical situation performance system 106 generates the behavior distribution 308 to include a distribution of behaviors for simulated transportation providers and simulated transportation requesters. For example, the critical situation performance system 106 can generate the behavior distribution 308 at least partly based on digital data from the historical data 302 that reflects the behaviors of transportation providers and/or transportation requesters within real-world locations. In some implementations, the critical situation performance system 106 can modify the behaviors as described below.

In some embodiments, the critical situation performance system 106 includes, as a feature of the behavior of simulated transportation providers, full compliance with the implemented dispatch model. For example, the critical situation performance system 106 can configure the behavior of simulated transportation providers so that they follow instructions provided by the implemented dispatch model and do not cancel or lapse in compliance after they are assigned a transportation request within simulation. In some implementations, however, the critical situation performance system 106 can vary the compliance of the simulated transportation providers. Further, in some embodiments, the critical situation performance system 106 configures the behavior of simulated transportation providers so that they do not perform ride swaps.

In some embodiments, the critical situation performance system 106 includes a degree of stochasticity in the behavior of the simulated transportation providers, even when fully compliant with the implemented dispatch model. To illustrate, the critical situation performance system 106 can include stochastic variation regarding how a simulated transportation provider complies with an instruction provided by the dispatch model, such as the speed with which the transportation provider positioning system moves within the simulated environment or the exact movement direction (e.g., around the vector pointing from a current location to a target location). In some embodiments, the critical situation performance system 106 implements this stochasticity in the form of zero-mean Gaussian noise with variance.

In some embodiments, the critical situation performance system 106 configures the behavior of simulated transportation requesters to be uniform with no variance. For example, the critical situation performance system 106 can configure the behavior so that simulated transportation requesters do not cancel or lapse transportation after their corresponding transportation request has been matched with a simulated transportation provider. Further, the critical situation performance system 106 can configure the behavior so that simulated transportation requesters do not change the destination of their respective transportation request.

In one or more embodiments, the critical situation performance system 106 generates the sensor distribution 310 to include a distribution of sensor capabilities, which affect the ability of a simulation model implemented by the critical situation performance system 106 to detect the positioning of simulated transportation providers and simulated transportation requesters. For example, the sensor distribution 310 can include a distribution of global positioning system (GPS) capabilities that reflect the GPS software that may be installed on computing devices associated with the simulated transportation providers and simulated transportation requesters.

In some implementations, the critical situation performance system 106 includes, within the sensor distribution 310, stochasticity in the form of zero-mean Gaussian noise with variance. The critical situation performance system 106 can apply this stochasticity to the longitudinal and latitudinal coordinates of the simulated transportation providers and simulated transportation requesters. In some embodiments, the critical situation performance system 106 utilizes, in simulation, different distributions to sample noise parameters for the locations of simulated transportation requesters and simulated transportation providers.

As shown in FIG. 3, based on the environment distribution 304, the scene distribution 306, the behavior distribution 308, and the sensor distribution 310, the critical situation performance system 106 can generate a situation distribution 312. In particular, the situation distribution 312 includes a distribution of initialized transportation provider situations. The initialized transportation provider situations of the situation distribution 312 can include features drawn from environment distribution 304, the scene distribution 306, the behavior distribution 308, and the sensor distribution 310. Accordingly, the situation distribution 312 can include initialized transportation provider situations having various combinations (e.g., possibly all possible combinations) of features drawn from those distributions.

In some embodiments, however, the critical situation performance system 106 draws features from one distribution based on the features drawn from another distribution when generating the situation distribution 312. For example, the critical situation performance system 106 can choose features drawn from the behavior distribution and the behavior distribution 308 and the sensor distribution 310 based on features drawn from the scene distribution 306.

As shown in FIG. 3, the critical situation performance system 106 can sample a set of initialized transportation provider situations 314 from the situation distribution 312. For example, in some implementations, the critical situation performance system 106 selects a random sampling for the set of initialized transportation provider situations 314.

Further, as shown in FIG. 3, the critical situation performance system 106 simulates the set of initialized transportation provider situations 314 propagated through time. In particular, the critical situation performance system 106 utilizes the simulation model 316 to simulate the set of initialized transportation provider situations 314 propagated through time.

As illustrated in FIG. 3, the simulation model 316 utilizes a simulation loop 318 to propagate the set of initialized transportation provider situations 314 through time. In some implementations, one cycle of the simulation loop 318 corresponds to one time step of the simulation generated by propagating the set of initialized transportation provider situations 314 through time. Indeed, the critical situation performance system 106 can utilize constant update frequencies for all generated simulations.

As shown in FIG. 3, the simulation loop 318 includes behavior models 320, sensor models 322, and dynamic models 324. Indeed, in one or more embodiments, the simulation loop 318 consists of three phases, where each of the three phases corresponds to one of the behavior model 320, the sensor model 322, or the dynamics model 324. In one or more embodiments, the simulation model 316 executes a phase for all agents (e.g., simulated transportation providers, simulated transportation requesters, and the implemented dispatch model) of the initialized transportation provider situation before moving onto the next phase.

Generally speaking, in the first phase of the simulation loop 318, the simulation model 316 causes each agent within the simulated environment to observe its current state using the sensor models 322. For example, a simulated transportation provider can observe its current location relative to a map of the simulated environment and further observe the conditions of the simulated environment and/or the transportation matching services within the simulated environment. In some implementations, the sensor models 322 provide perfect observations. In some embodiments, however, the sensor models 322 provide partial observations to reflect, for example, partial observability of real-world transportation providers due to the limited field of view provided by an application operating on their computing devices, their inattention, or their inability to observe the intentions or actions of other agents. In some embodiments, the sensor models 322 provides information to the implemented dispatch model in a form that reflects received signals that were generated on the computing devices of real-world transportation providers.

In the second phase of the simulation loop 318, the simulation model 316 can cause each agent to select an action to be executed during the current time step using the behavior models 320. In some implementations, the behavior models 320 cause the agents to follow stochastic policies by utilizing random number generators to influence action selection. To illustrate, the behavior models 320 can generate, for an agent, a distribution of actions based on the state observed by the agent in the first phase of the simulation loop 318. The behavior models 320 can sample an action to be executed by the agent from the distribution.

In the third phase of the simulation loop 318, the simulation model 316 can cause each agent to execute the action selected for that agent using the dynamic models 324. Thus, the simulation model 316 can propagate an initialized transportation provider situation through time. In one or more embodiments, through propagation, the simulation model 316 state transitions for the various agents.

More detail regarding each model will now be provided. As suggested above, in one or more embodiments, the behavior models 320 are deterministic and fully compliant with the implemented dispatch model with regard to the simulated transportation providers but can include stochasticity in the form of, for example, zero-mean Gaussian noise with variance. Further, in some embodiments, the behavior models 320 only cause the simulated transportation requesters to request private rides so that each transportation request includes one pick-up location and one destination location. In some embodiments, the behavior models 320 further cause simulated transportation providers to depart to pick up simulated transportation requesters immediately after reaching the destination location of their previously-assigned transportation request in order to approximate linked rides.

In some embodiments, the behavior models 320 cause simulated transportation requesters to behave the same with regard to the pricing of transportation requests. In particular, the behavior models 320 can cause the simulated transportation requesters to request transportation at a predetermined conversion/rate probability, which is dependent on the price. In some embodiments, the simulation model 316 models price to be dependent on the neighborhood supply and demand. For example, the simulation model 316 can determine the probability of conversion in a location based on the number of simulated transportation providers available to accept a transportation request minus a small number of simulated transportation providers reserved to maintain a minimum level of service divided by the number of ride intents exhibited by the simulated transportation requesters. In some embodiments, the simulation model 316 determines supply and demand counts using neighborhood aggregates. In some instances, the simulation model 316 clips conversion probabilities at a determined minimum to reflect an upper bound on prices.

Further, as suggested, the simulation model 316 can utilize the sensor models 322 to provide location signals. Additionally, the sensor models 322 can incorporate noise in the form of zero-mean Gaussian noise with variance that is initialized during generation of the initialized transportation provider situations. In one or more embodiments, the sensor models 322 apply the random noise to the actual location traces of the simulated transportation providers and the simulated transportation requesters.

In some embodiments, the simulation model 316 utilizes the dynamic models 324 to cause the simulated transportation providers to move using a kinematics model. Further, the dynamic models 324 can cause simulated transportation providers to either move at a constant velocity or stop moving entirely based on the instructions provided by the dispatch model. In some implementations, the dynamic models 324 sample a movement speed for a simulated transportation provider from a speed distribution that is generated for a simulated environment during generation of the initialized transportation provider situations. The simulation model 316 can further utilize the dynamic models 324 to factor the speed of a simulated transportation provider into travel time estimates by incorporating a bias term into the algorithm used for determining ETAs.

In one or more embodiments, the simulation model 316 further utilizes the dynamic models 324 to determine the probability of a simulated transportation provider being dispatched to a simulated transportation requester based on a ratio of transportation requests to the current supply in a dispatch neighborhood defined by a predetermined minimum ETA radius, upper-bounded by 1. In some implementations, the dynamic models 324 samples the number of transportation requests using a Binomial distribution parameterized by the number of simulated transportation requesters and the predetermined probability of conversion.

In one or more embodiments, the simulation model 316 runs the simulation loop 318 (e.g., simulates an initialized transportation provider situation propagated through time) for a predetermined number of steps and at a predetermined frequency. In some implementations, the simulation model 316 terminates the simulation if one or more performance metric threshold are breached. Indeed, the critical situation performance system 106 can establish thresholds for one or more performance metrics and terminate simulation if at least one threshold is breached. As will be discussed below, however, in some implementations, the simulation model 316 runs the simulation loop 318 until a simulated environment degradation event is detected.

In some implementations, the simulation model 316 utilizes an initialized transportation provider situation form a first-order Markov chain that is sufficient to produce all relevant transportation provider performance scenarios through simulation, such as through Monte Carlo simulation. Accordingly, in some embodiments, the critical situation performance system 106 utilizes the simulation model 316 to effectively sample a transportation provider performance scenario from an initialized transportation provider situation by running the simulation loop 318.

As further shown in FIG. 3, the simulation model 316 includes a dispatch model. In particular, the simulation model 316 includes the Gaussian random walk model 326. The simulation model 316 utilizes the Gaussian random walk model 326 to at least partially direct a behavior of the simulated transportation providers during simulation, such as by assigning transportation requests to simulating transportation providers. Though shown as a separate component, the simulation model 316 can incorporate the Gaussian random walk model 326 in the behavior models 320 in one or more embodiments.

Figure 4:
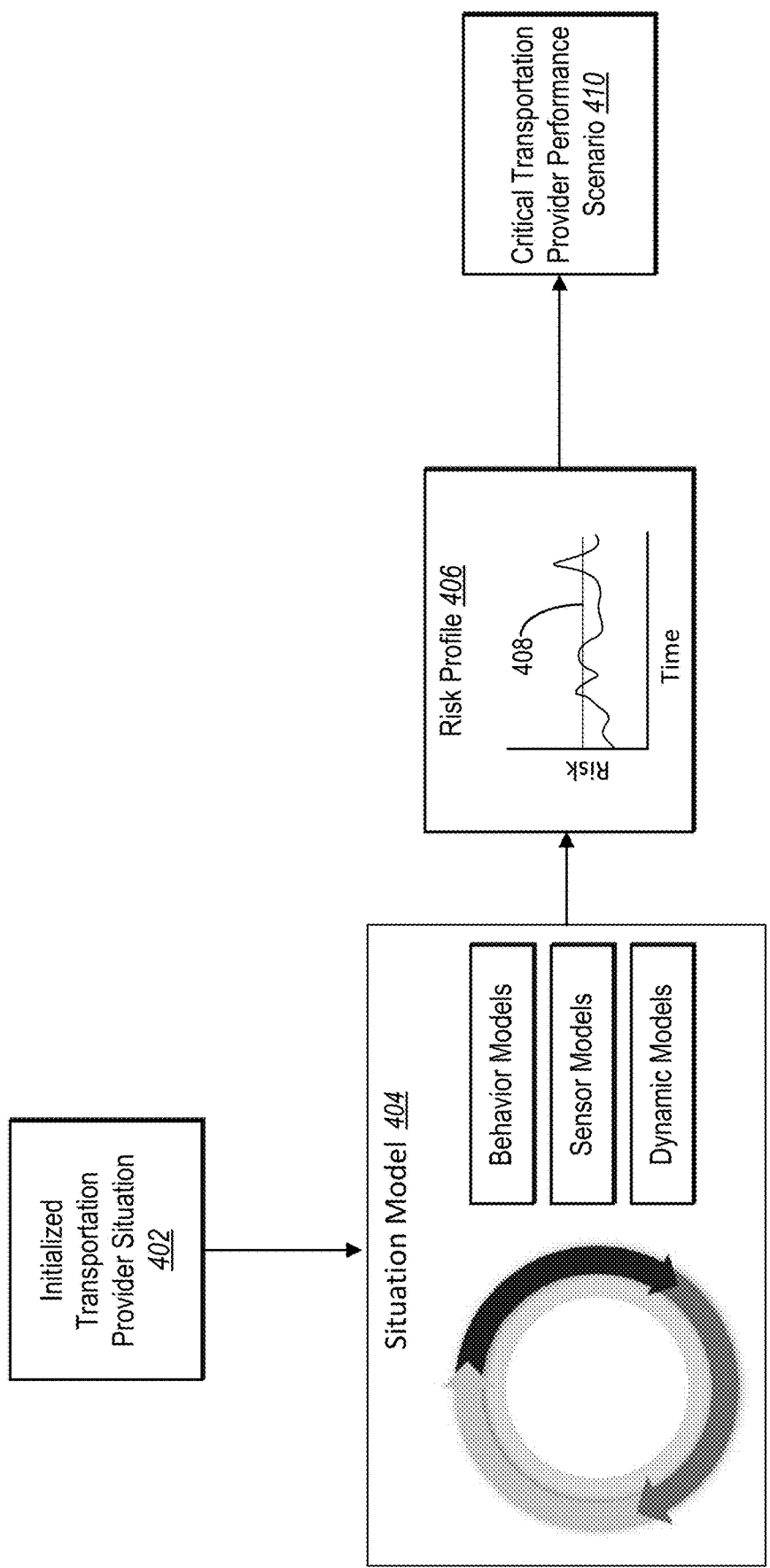
FIG. 4 illustrates a diagram for determining a critical transportation provider performance scenario based on simulating an initialized transportation provider situation in accordance with one or more embodiments.

As mentioned above, the critical situation performance system 106 can determine critical transportation provider performance scenarios based on simulating a set of initialized transportation provider situations propagated through time. FIG. 4 illustrates a diagram for determining a critical transportation provider performance scenario based on simulating an initialized transportation provider situation in accordance with one or more embodiments.

For example, as shown in FIG. 4, the critical situation performance system 106 provides an initialized transportation provider situation 402 to the simulation model 404. The critical situation performance system 106 can utilize the simulation model 404 to simulate the initialized transportation provider situation 402 propagated through time as discussed above with reference to FIG. 3. The simulation model 404 can utilize a Gaussian random walk model to at least partially direct the behavior of the simulated transportation providers when propagating the initialized transportation provider situation 402 through time.

In some embodiments, the critical situation performance system 106 utilizes the simulation model 404 to propagate the initialized transportation provider situation 402 through time until a simulated environment degradation event is detected. To illustrate, the critical situation performance system 106 can propagate the initialized transportation provider situation 402 through time (e.g., indefinitely). At some point during the simulation, the critical situation performance system 106 can detect a simulated environment degradation event (e.g., low utilization of simulated transportation providers despite high demand). In response to detecting the simulated environment degradation event, the critical situation performance system 106 can terminate simulation of the initialized transportation provider situation 402.

The critical situation performance system 106 can determine a risk metric corresponding to the initialized transportation provider situation 402 (e.g., corresponding to the simulation generated by propagating the initialized transportation provider situation 402 through time). For example, the critical situation performance system 106 can generate a risk profile 406 that reflects the value of the risk metric at each time step. In one or more embodiments, the critical situation performance system 106 determines the value of the risk metric at each timestep using Monte Carlo rollouts. In some embodiments, as suggested above, the critical situation performance system 106 determines the value of the risk metric as the aggregate over all identifiable forms of degradation as follows:

$$\text{risk} = \sum_{degradation} \text{probability of degradation} \times \text{severity of degradation} \quad (1)$$

In some implementations, the critical situation performance system 106 determines features that, together, form a rough decision tree-type rule that indicates various degrees of degradation. For example, in some embodiments, the critical situation performance system 106 determines off-trip utilization based on the ratio of simulated transportation providers that are not associated with a transportation request to those that are traveling to pick up a simulated transportation requester. To illustrates, in some embodiments, the critical situation performance system 106 determines that a ratio between [0, 0.5) reflects over-utilization of supply or under-supply, a ratio between [0.5, 1) represents a "healthy" status, and a ratio between [1, infinity) reflects under-utilization of supply or over-supply. Further, the critical situation performance system 106 can determine the ETA from the time the simulated transportation provider accepts (or is assigned) a transportation request to the pickup of the simulated transportation requester. For example, the critical situation performance system 106 can base degradation off of the ninety-fifth percentile of the simulated environment over a rolling time window.

In one or more embodiments, the critical situation performance system 106 further establishes a risk threshold 408. The critical situation performance system 106 can compare the risk metric corresponding to the critical situation performance system 106 against the risk threshold 408. In particular, the critical situation performance system 106 can compare the value of the risk metric at each time step of the simulation to the risk threshold 408.

Based on comparing the risk metric to the risk threshold 408, the critical situation performance system 106 can determine a critical transportation provider performance scenario 410. For example, using the risk profile 406, the critical situation performance system 106 can identify a portion of the initialized transportation provider situation 402 propagated through time that occurs before the risk metric crosses (e.g., rises above) the risk threshold 408. The identified portion can include one or more snapshots (e.g., instances) of the initialized transportation provider situation 402 propagated through time (which are, themselves, situations that have been created through the simulation process). The critical situation performance system 106 can determine that this portion of the initialized transportation provider situation 402 is a critical transportation provider performance scenario 410.

In one or more embodiments, the risk metric crosses (e.g., rises above) the risk threshold 408 in multiple instances as the corresponding initialized transportation provider situation is propagated through time. Accordingly, the critical situation performance system 106 can identify multiple critical transportation provider performance scenarios. In some instances, however, the critical situation performance system 106 only identifies one critical transportation provider performance scenario even if the risk metric crosses the risk threshold 408 in multiple instances (e.g., identifies a critical transportation provider performance scenario corresponding to the first instance where the risk metric crosses the risk threshold 408).

Figure 5:
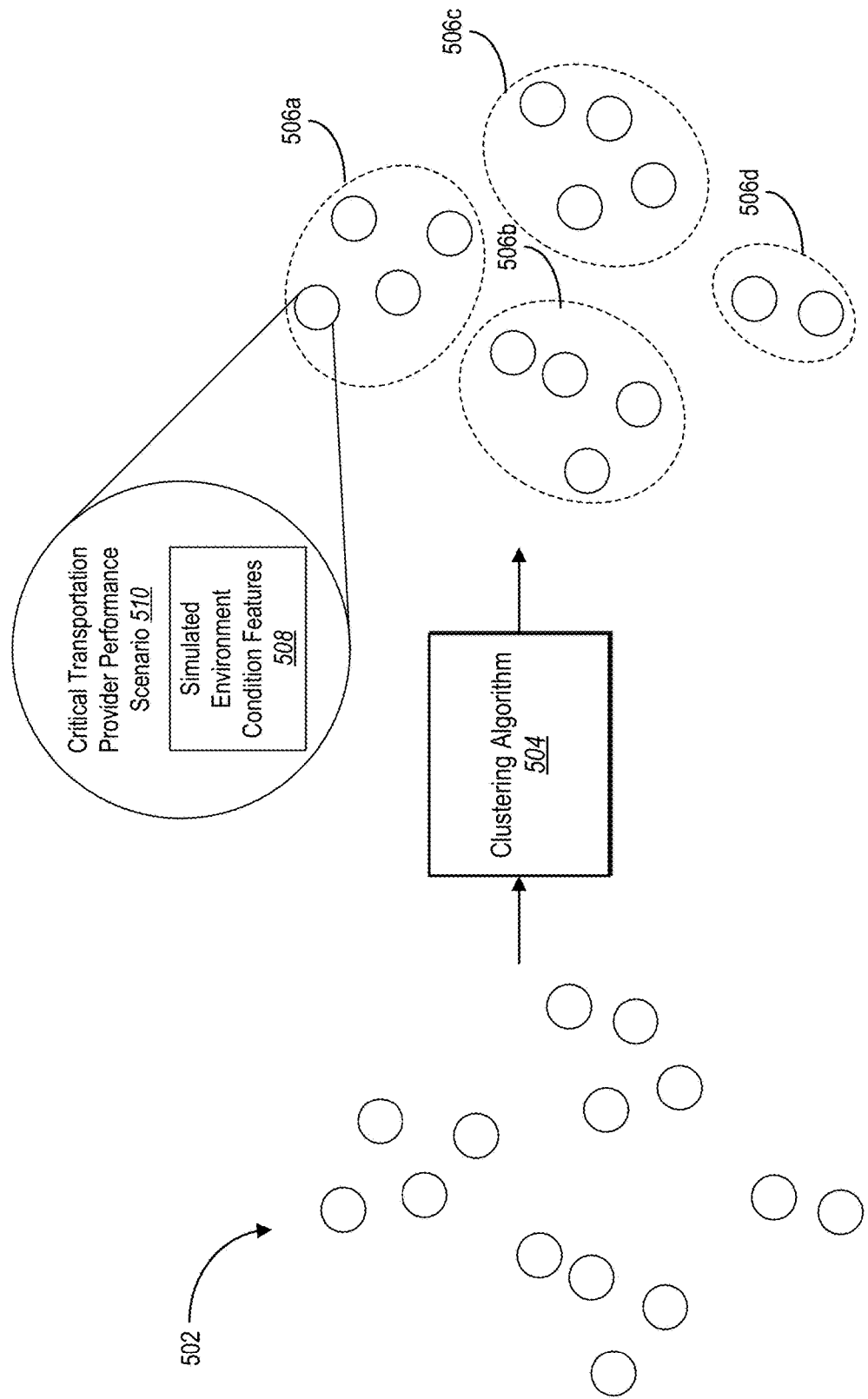
FIG. 5 illustrates a diagram for generating critical situation clusters in accordance with one or more embodiments.

As previously discussed, the critical situation performance system 106 can generate critical situation clusters based on the determined critical transportation provider performance scenarios. FIG. 5 illustrates a diagram for generating critical situation clusters in accordance with one or more embodiments.

As shown in FIG. 5, the critical situation performance system 106 determines or otherwise identifies critical transportation provider performance scenarios 502 as discussed above with reference to FIG. 4. The critical situation performance system 106 further utilizes a clustering algorithm 504 to group the critical transportation provider performance scenarios 502 into critical situation clusters 506a-506d.

Though FIG. 5 illustrates each of the critical situation clusters 506a-506d including multiple critical transportation provider performance scenarios, a critical situation cluster can include as few as one critical transportation provider performance scenario in some embodiments.

In one or more embodiments, the critical situation performance system 106 generates the critical situation clusters 506a-506d based on one or more simulated environment condition features corresponding to each critical transportation provider performance scenario (e.g., the simulated environment condition features 508 associated with the critical transportation provider performance scenario 510). Indeed, the critical situation performance system 106 can determine or otherwise identify one or more simulated environment condition features (e.g., off-trip and in-ride utilization, price and ETA distribution statistics, or demand and supply counts). For example, in some implementations, the critical situation performance system 106 extracts the one or more simulated environment condition features at the point of simulation where the value of the corresponding risk metric crosses the established risk threshold (or a pre-determined, threshold time prior to the crossing point). The critical situation performance system 106 can utilize the clustering algorithm 504 to generate the critical situation clusters 506a-506d accordingly.

In one or more embodiments, each of the critical situation clusters 506a-506d corresponds to one or more critical transportation provider situations. Indeed, as discussed above, a portion of an initialized transportation provider situation propagated through time (i.e., a critical transportation provider performance scenario) can include one or more snapshots (e.g., instances) of the initialized transportation provider situation propagated through time. These snapshots are, themselves, critical transportation provider situations that have been created through the simulation process.

In some implementations, the critical situation performance system 106 performs one or more additional checks to verify that the critical situation clusters 506a-506d correspond to critical transportation provider situations. For instance, to provide additional clarity to whether simulated transportation providers were over-utilized or under-utilized, the critical situation performance system 106 can consider the following: a decrease in the ratio of simulated transportation providers unassociated with a transportation request to those traveling to pick up a transportation requester as an indication of over-utilization; or an increase in such a ratio as an indication of under-utilization.

Figure 6:
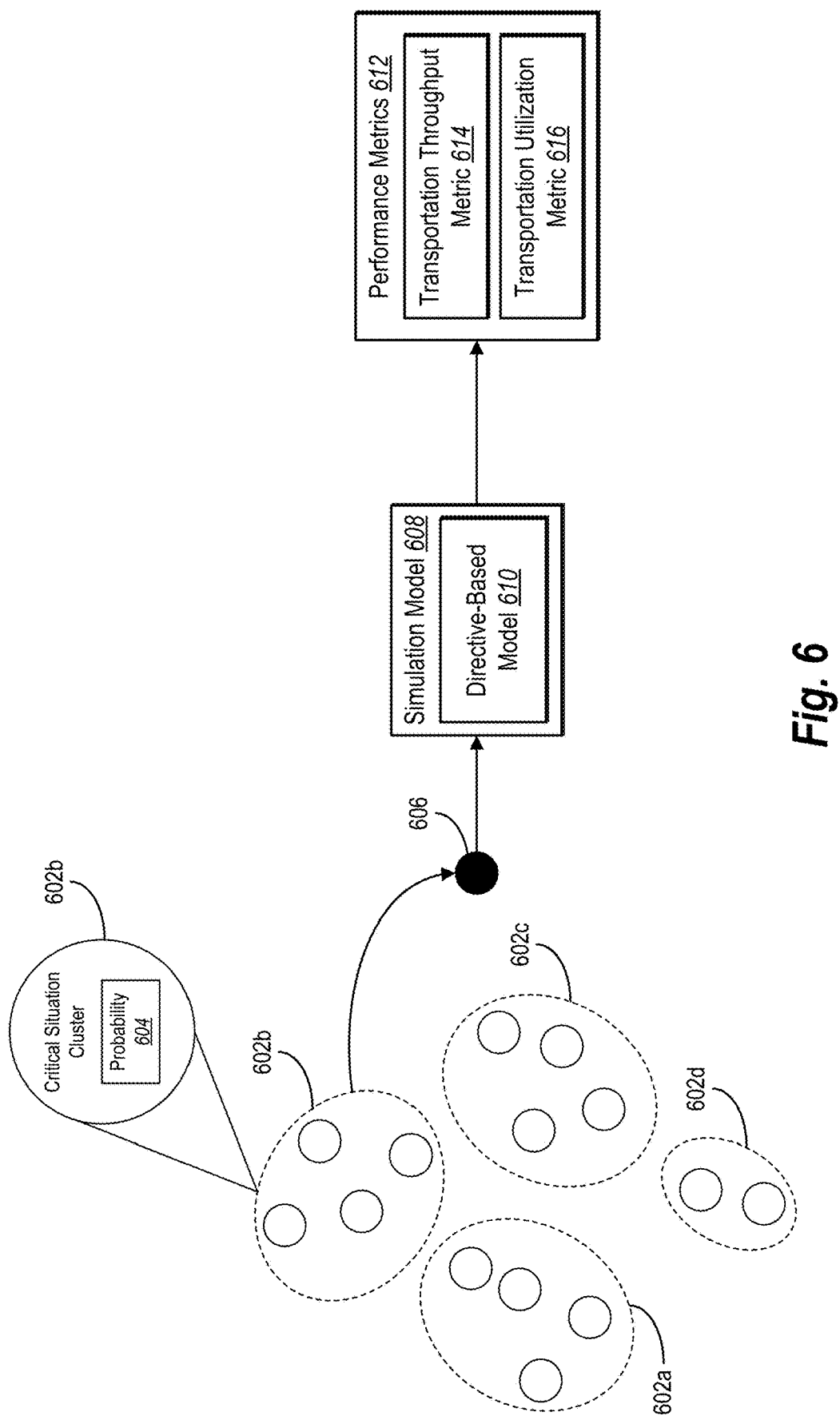
FIG. 6 illustrates a diagram for generating one or more performance metrics in accordance with one or more embodiments.

As further mentioned, the critical situation performance system 106 can generate one or more performance metrics for a critical transportation provider situation. FIG. 6 illustrates a diagram for generating one or more performance metrics in accordance with one or more embodiments. As shown in FIG. 6, the critical situation performance system 106 groups critical transportation provider performance scenarios into the critical situation clusters 602a-602d as discussed above with reference to FIG. 5.

Further, as shown, the critical situation performance system 106 determines a probability for each of the critical situation clusters 602a-602d (e.g., the probability 604 for the critical situation cluster 602b). For example, in one or more embodiments, the critical situation performance system 106 determines the probability for a critical situation cluster based on a rate of occurrence when simulating the set of initialized transportation provider situations propagated through time. In particular, the critical situation performance system 106 can determine the probability based on the rate at which the critical transportation provider performance scenarios of the critical situation cluster occurred while simulating the set of initialized transportation provider situations propagated through time. In some embodiments, the critical situation performance system 106 determines the probability of a critical situation cluster based on the number of critical transportation provider performance scenarios or critical transportation providers situations that correspond to the critical situation cluster.

As shown in FIG. 6, the critical situation performance system 106 samples a critical transportation provider situation 606 from the critical situation clusters 602*a*-602*d*. For example, in some instances, the critical situation performance system 106 samples the critical transportation provider situation 606 based on the probability of the corresponding critical situation cluster (e.g., the probability 604 of the critical situation cluster 602*b*).

In one or more embodiments, sampling a critical transportation provider situation 606 from the critical situation clusters 602*a*-602*d* includes generating a new critical transportation provider situation based on characteristics of features represented by the critical situation clusters 602*a*-602*d*. For example, the critical situation performance system 106 can sample characteristics or features from critical transportation provider performance scenarios represented by one or more of the critical situation clusters 602*a*-602*d* (e.g., based on their corresponding probabilities) and combine the sampled characteristics or features to generate a critical transportation provider situation. To illustrate, in some implementations, the critical situation performance system 106 generates a distribution of characteristics (e.g., environment characteristics, behavior characteristics, etc.) where the probability of the characteristics being sampled corresponds to the probabilities of the critical situation cluster(s) in which the characteristics are represented. The critical situation performance system 106 can sample characteristics from this distribution to generate a critical transportation provider situation.

Further, as shown in FIG. 6, the critical situation performance system 106 provides the critical transportation provider situation 606 to the simulation model 608. The critical situation performance system 106 can utilize the simulation model 608 to propagate the critical transportation provider situation 606 through time. In one or more embodiments, the simulation model 608 operates similar to the simulation model 316 of FIG. 3 except that the simulation model 608 includes, as the dispatch model, the directive-based model 610.

Indeed, as previously explained, the simulation model 608 can utilize the directive-based model 610 to at least partially direct a behavior of a set of simulated transportation providers through provided directives. For example, for a given simulated transportation provider that is within the simulated environment and available to receive a transportation request, the directive-based model 610 can determine a target location (e.g., a target location for the transportation provider to wait until receiving a transportation request). The target location can include the current location of the simulated transportation provider or a location that is different from the current location, whether inside or outside the simulated environment. The directive-based model 610 can determine the target location based on various factors associated with each possible location, such as the number of simulated transportation providers that will be arriving within the location (e.g., by logging on to the system, beginning an assigned shift, or to drop off a simulated transportation requester), the number of simulated transportation providers that will be leaving the location (e.g., by logging off of the system, ending an assigned shift, or to drop off a simulated transportation requester), or other factors that indicate a potential demand for transportation.

Based on the determined target location the directive-based model 610 can provide a directive to the simulated transportation provider. For example, the directive-based model 610 can provide a stay directive to indicate that the simulated transportation provider is to stay at a current location; or the directive-based model 610 can provide a reposition directive to indicate that the simulated transportation provider is to relocate to a new target location. The directive-based model 610 can further indicate, through the directive, that the simulated transportation provider is to remain at the assigned target location until a transportation request is provided or a cool-down timer expires, at which time the directive-based model can provide a new directive.

By utilizing the simulation model 608 to propagate the critical transportation provider situation 606, the critical situation performance system 106 can generate the performance metrics 612 for the critical transportation provider situation 606. In particular, as shown in FIG. 6, the critical situation performance system 106 generates the transportation throughput metric 614 and the transportation utilization metric 616. In some embodiments, the critical situation performance system 106 generates fewer or additional performance metrics. In one or more embodiments, the critical situation performance system 106 generates the performance metrics 612 after simulating multiple critical transportation provider situations sample from the critical situation clusters 602*a*-602*d*, allowing the performance metrics 612 to more generally reflect performance of the directive-based model 610.

Thus, the critical situation performance system 106 can measure how the directive-based model 610 performs in critical transportation provider situations. Indeed, as mentioned above, the critical situation performance system 106 can utilize a simulation model implementing a different dispatch model (e.g., the Gaussian random walk model) to identify those critical transportation provider situations that can lead to the degradation of transportation matching services. The critical situation performance system 106 can further simulate these critical transportation provider situations using the directive-based model to determine whether the directive-based model improves performance and possibly avoids degradation. It should be noted that utilizing a simulation model that implements the different dispatch model further reflects potential real-world instances where the directive-based model is not functional and transportation providers are given broad parameters to drive within assigned locations. In some implementations, the critical situation performance system 106 further simulates one or more critical transportation provider situations that have been received (e.g., via user input) using the directive-based model (e.g., to measure performance on a set of critical transportation provider situations that may be particularly relevant to transportation matching services).

The critical situation performance system 106 introduces an unconventional approach to validating computer-implemented models, such as the directive-based model. Indeed, the critical situation performance system 106 utilizes an unconventional ordered combination of actions that, generally, determines critical transportation provider performance scenarios based on simulations generated using a first dispatch model, groups the critical transportation provider performance scenarios into critical situation clusters, and then simulates sampled critical transportation provider situations using a second dispatch model (e.g., the directive-based model) to generate performance metrics for the second dispatch model. Because models that perform well in critical situations likely also perform well in benign situations, the critical situation performance system 106 can thus determine performance of the directive-based model under various possible conditions, including those potentially harmful to the provision of transportation matching services. Further, by utilizing two dispatch models, the critical situation performance system 106 can establish confidence in the performance of the directive-based model in situations where the first dispatch model failed to perform adequately.

Further, the critical situation performance system 106 can operate more efficiently than conventional systems. Indeed, by generating performance metrics based on sampled critical transportation provider situations, the reduces the number of simulations that are generated compared to conventional systems, such as those that implement a brute-force approach by simulating every conceivable combination of conditions. Thus, the critical situation performance system reduces the computing resources (e.g., memory, processing power, and processing time) needed to validate performance of computer-implemented models. Further, by prioritizing simulation under critical transportation provider situations-rather than the random sampling approach of some conventional systems that leads to simulation of strictly or mostly benign situations—the critical situation performance system 106 more accurately measures the performance of the computer-implemented model under the broad range of possible situations.

Figure 7:
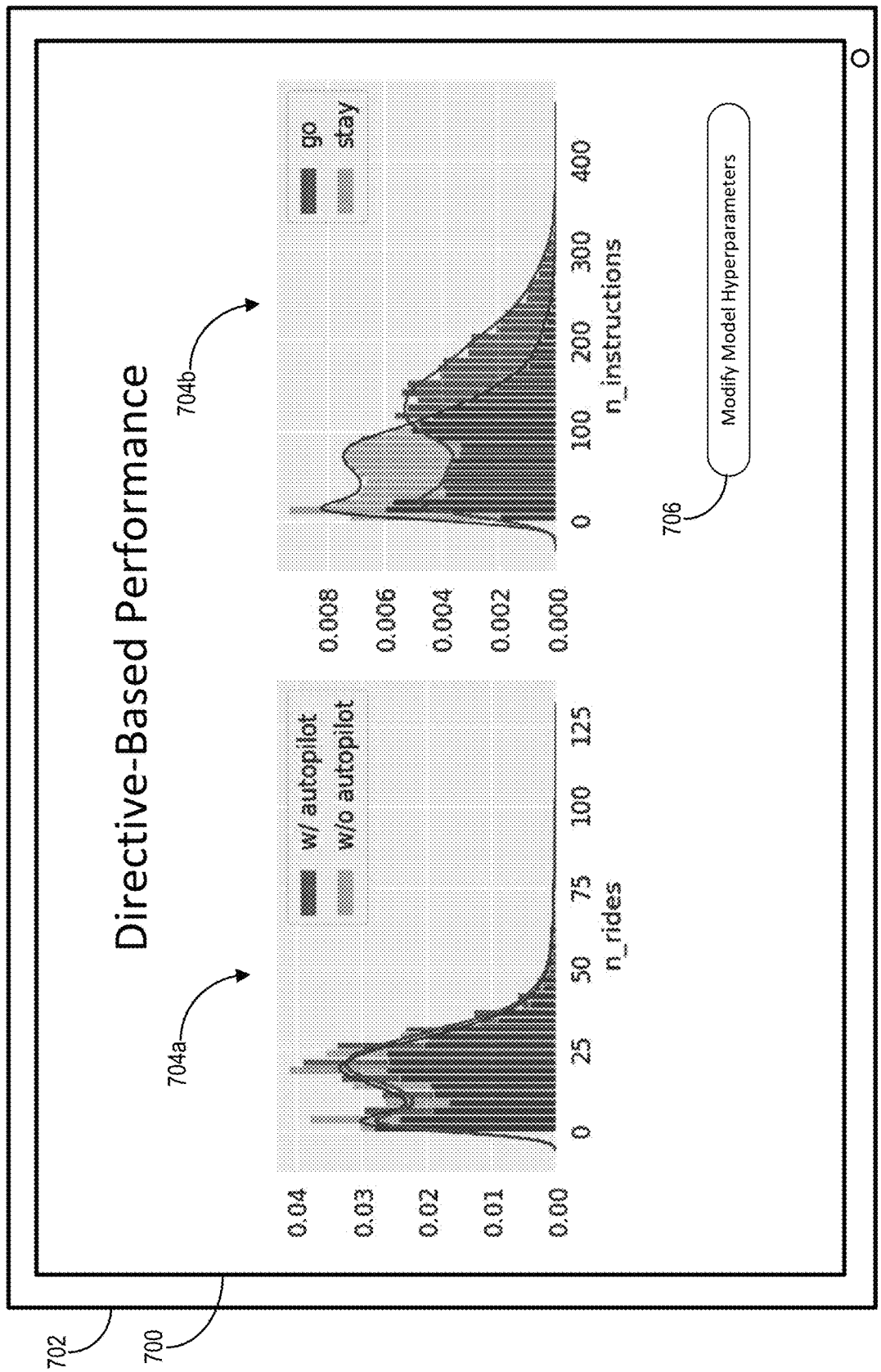
FIG. 7 illustrates a graphical user interface for providing various viewing and interactive features in accordance with one or more embodiments.

In one or more embodiments, the critical situation performance system 106 provides various viewing and interactive features via a computing device. FIG. 7 illustrates a graphical user interface for providing various viewing and interactive features in accordance with one or more embodiments.

For example, FIG. 7 illustrates a graphical user interface 700 displayed on a computing device 702. As shown, the critical situation performance system 106 provides, for display within the graphical user interface 700, performance metrics for the directive-based model. In particular, the critical situation performance system 106 provides the performance metric for display as part of the graphs 704a-704b. Indeed, the critical situation performance system 106 can generate one or more visual elements (e.g., graphs, tables, reports, etc.) based on the performance metrics that correspond to the directive-based model and provide the visual element(s) for display within the graphical user interface 700. In some embodiments, the critical situation performance system 106 provides the performance metrics for display as raw numbers.

Further, as shown, the critical situation performance system 106 provides a selectable option 706 for display within the graphical user interface 700. In response to detecting a selection of the selectable option 706, the critical situation performance system 106 can enable a user of the computing device 702 to modify hyperparameters of the directive-based model. For example, the critical situation performance system 106 can enable a user to modify a rate at which the cool-down timer of the directive-based model expires, the distance that a reposition directive will require a simulated transportation provider to travel, etc. Thus, the critical situation performance system 106 can measure the performance of the directive-based model using various combinations of hyperparameters. It should be noted that the critical situation performance system 106 can enable a user to modify the hyperparameters in various ways and that the selectable option 706 is merely an illustration. Further, in some implementations, the critical situation performance system 106 modifies the hyperparameters without the need for user input. Indeed, the critical situation performance system 106 can operate to optimize the hyperparameters of the directive-based model.

In one or more embodiments, the critical situation performance system 106 modifies the hyperparameters by choosing a set of hyperparameters that result in a highest performance. For example, the critical situation performance system 106 can generate simulations using variations of the directive-based model implementing different sets of hyperparameter values. The critical situation performance system 106 can compare the performance of these variations to determine which set of hyperparameter values provides the best performance in one or more metrics (ETAs, projected profits, etc.). The critical situation performance system 106 can further modify the hyperparameters to reflect the set of hyperparameter values that provided the best performance. In some implementations, the critical situation performance system 106 provides visual representations of the performance comparisons for display within the graphical user interface 700 and modifies the hyperparameters based on inputs provided by the users, such as inputs that select a particular set of hyperparameters that provided the highest performance with regard to a particular metric.

In some instances, the critical situation performance system 106 determines a policy gradient based on performance metrics of the directive-based model. Based on the policy gradient, the critical situation performance system 106 can iteratively generate simulations to test how the directive-based model performs with a set of hyperparameters and select new hyperparameters to re-test the performance of the directive-based model. The critical situation performance system 106 can iteratively test the directive-based model until it has determined convergence on a set of hyperparameters that provide the most desirable results. Accordingly, the critical situation performance system 106 can modify the hyperparameters of the directive-based model to reflect these best-performing hyperparameters.

By providing visual and interactive features for display within a graphical user interface, the critical situation performance system 106 can improve the efficiency of a computing device. In particular, by providing user interfaces for visualizing the performance of the directive-based model and/or modifying the hyperparameters of the directive-based model, the critical situation performance system 106 can improve the efficiency of using a computing device. For example, the critical situation performance system 106 can reduce the number of steps required by a user to view the performance of a computer-implemented model under conventional systems.

Figure 8:
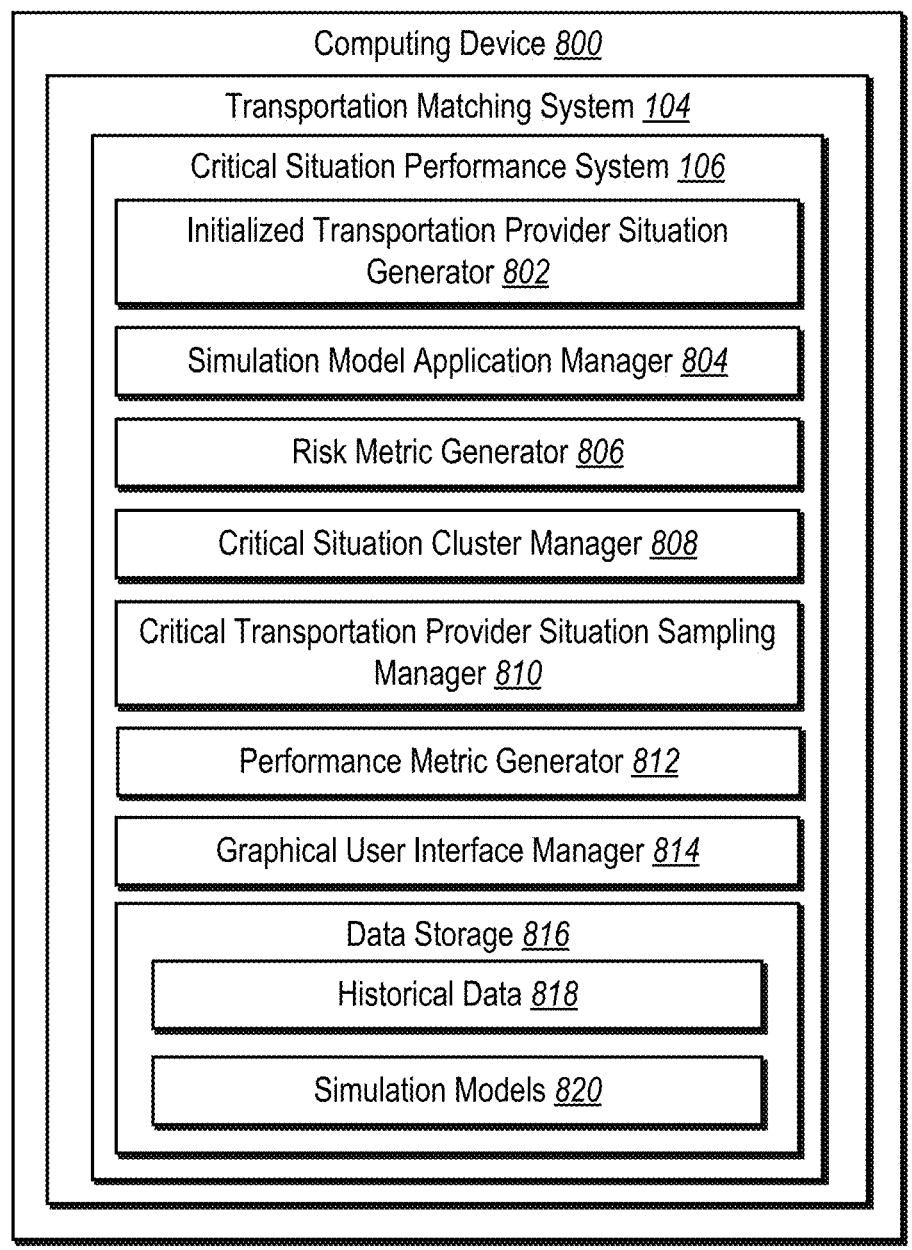
FIG. 8 illustrates an example schematic diagram of a critical situation performance system in accordance with one or more embodiments.

Turning now to FIG. 8, additional detail will be provided regarding various components and capabilities of the critical situation performance system 106. In particular, FIG. 8 illustrates the critical situation performance system 106 implemented by a computing device 800 (e.g. the server(s) 102 and/or the client device 110 discussed above with reference to FIG. 1). Additionally, the critical situation performance system 106 is also part of the transportation matching system 104. As shown, the critical situation performance system 106 can include, but is not limited to, an initialized transportation provider situation generator 802, a simulation model application manager 804, a risk metric generator 806, a critical situation cluster manager 808, a critical transportation provider situation sampling manager 810, a performance metric generator 812, a graphical user interface manager 814, and data storage 816 (which includes historical data 818 and simulation models 820).

As just mentioned, and as illustrated in FIG. 8, the critical situation performance system 106 includes the initialized transportation provider situation generator 802. In particular, the initialized transportation provider situation generator 802 can generate a set of initialized transportation provider situations. For example, the initialized transportation provider situation generator 802 can generate one or more distributions of data (e.g., an environment distribution, a scene distribution, a behavior distribution, and/or a sensor distribution) using historical data 818. The initialized transportation provider situation generator 802 can further generate a situation distribution based on the one or more distributions of data. Sampling from the situation distribution, the initialized transportation provider situation generator 802 can generate the set of initialized transportation provider situations.

Additionally, as shown in FIG. 8, the critical situation performance system 106 includes the simulation model application manager 804. In particular, the simulation model application manager 804 can utilize a simulation model to propagate transportation provider situations through time. For example, the simulation model application manager 804 can utilize a simulation model having a first dispatch model (e.g., a Gaussian random walk model) to propagate, through time, the set of initialized transportation provider situations generated by the initialized transportation provider situation generator 802. Additionally, the simulation model application manager 804 can utilize a simulation model having a second dispatch model (e.g., a directive-based model) to propagate sampled critical transportation provider situations through time. In one or more embodiments, the simulation model application manager 804 implements behavior models, sensor models, and dynamic models to propagate the transportation provider situations through time in various phases.

Further, as shown in FIG. 8, the critical situation performance system 106 includes the risk metric generator 806. In particular, the risk metric generator 806 can generate or otherwise determine risk metrics corresponding to initialized transportation provider situations. For example, the risk metric generator 806 can generate risk profiles for a set of initialized transportation provider situations that have been propagated through time by the simulation model application manager 804, where a risk profile includes the value of a corresponding risk metric at each time step of the simulation.

As further shown in FIG. 8, the critical situation performance system 106 includes the critical situation cluster manager 808. In particular, the critical situation cluster manager 808 can group critical transportation provider performance scenarios into one or more critical situation clusters. Indeed, the critical situation cluster manager 808 can determine critical transportation provider performance scenarios, such as by comparing the risk metrics corresponding to initialized critical transportation provider situations propagated through time to a risk threshold. The critical situation cluster manager 808 can further group the determined critical transportation provider performance scenarios into critical situation clusters. For example, the critical situation cluster manager 808 can group the critical transportation provider performance scenarios based on corresponding simulated environment condition features. Further, the critical situation cluster manager 808 can determine a probability for each critical situation cluster.

As shown in FIG. 8, the critical situation performance system 106 also includes the critical transportation provider situation sampling manager 810. In particular, the critical transportation provider situation sampling manager 810 can sample a critical transportation provider situation from the critical situation clusters generated by the critical situation cluster manager 808. For example, the critical transportation provider situation sampling manager 810 can sample a critical transportation provider situation based on a probability corresponding to each critical situation cluster.

Additionally, as shown in FIG. 8, the critical situation performance system 106 includes the performance metric generator 812. In particular, the performance metric generator 812 can generate one or more performance metrics for a critical transportation provider situation. For example, the performance metric generator 812 can generate performance metrics for a critical transportation provider situation that has been propagated through time by the simulation model manager.

Further, as shown in FIG. 8, the critical situation performance system 106 includes the graphical user interface manager 814. In particular, the graphical user interface manager 814 can provider various viewing elements and/or interactive elements for display on a graphical user interface of a computing device. For example, the graphical user interface manager 814 can provide, for display within a graphical user interface, performance metrics corresponding to a critical transportation provider situation (e.g., in the form of a graph, table, chart, etc.) and/or a selectable option for modifying hyperparameters of a dispatch model, such as the directive-based model.

As further shown in FIG. 8, the critical situation performance system 106 includes data storage 816. In particular, data storage 816 includes historical data 818 and simulation models 820. Historical data 818 can store the historical data used to generate the one or more distributions of data, including the situation distribution containing the distribution of initialized transportation provider situations. Simulation models 820 can store the simulation models utilized by the simulation model application manager 804 to generate simulations by propagating transportation provider situations through time. Simulation models 820 can further store the dispatch models used in the simulations (e.g., the Gaussian random walk model and the directive-based model).

Each of the components 802-820 of the critical situation performance system 106 can include software, hardware, or both. For example, the components 802-820 can include one or more instructions stored on a computer-readable storage medium and executable by processors of one or more computing devices, such as a client device or server device. When executed by the one or more processors, the computer-executable instructions of the critical situation performance system 106 can cause the computing device(s) to perform the methods described herein. Alternatively, the components 802-820 can include hardware, such as a special-purpose processing device to perform a certain function or group of functions. Alternatively, the components 802-820 of the critical situation performance system 106 can include a combination of computer-executable instructions and hardware.

Furthermore, the components 802-820 of the critical situation performance system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-820 of the critical situation performance system 106 may be implemented as a stand-alone application, such as a desktop or mobile application. Furthermore, the components 802-820 of the critical situation performance system 106 may be implemented as one or more web-based applications hosted on a remote server. Alternatively, or additionally, the components 802-820 of the critical situation performance system 106 may be implemented in a suite of mobile device applications or "apps."

Figure 9:
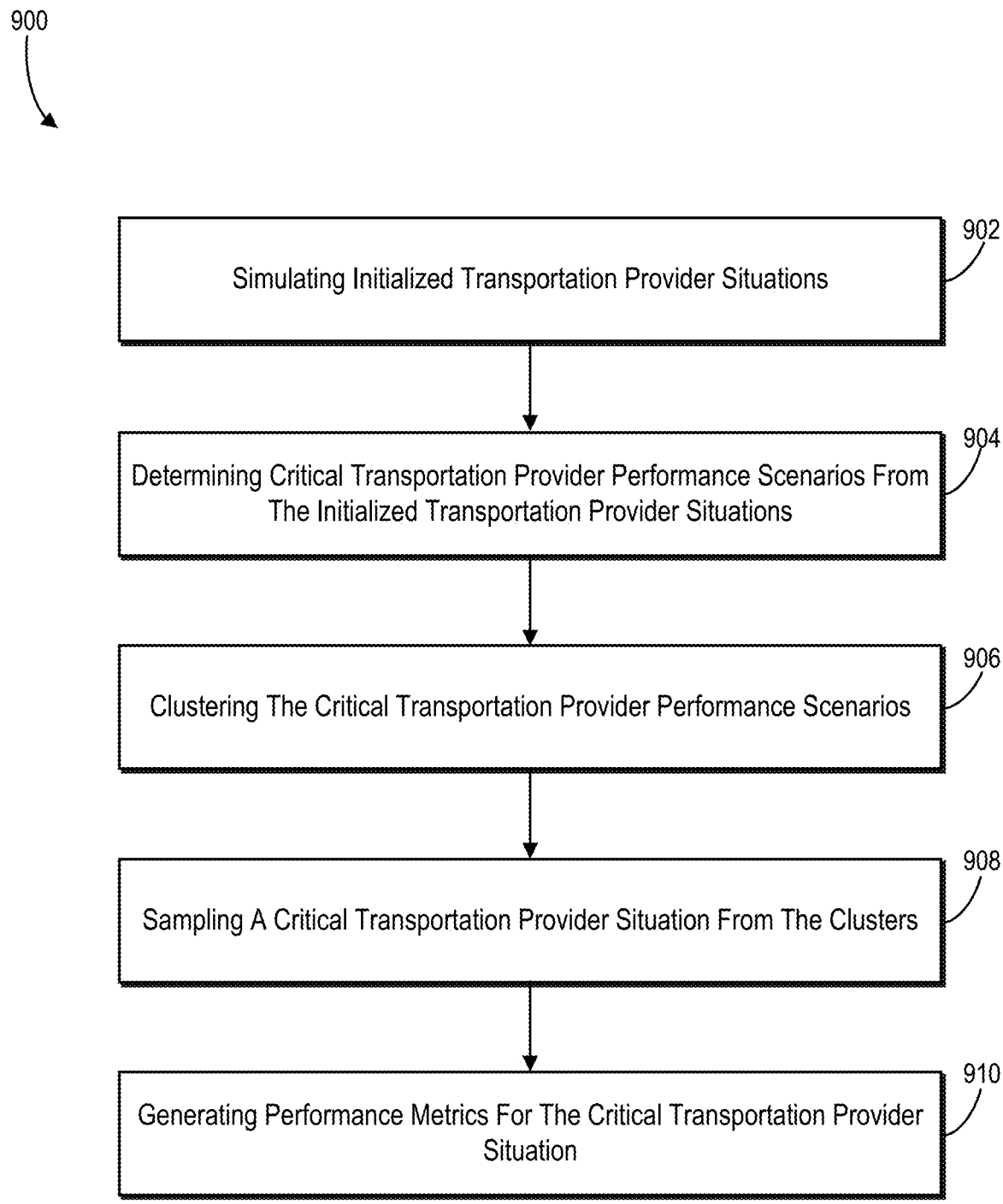
FIG. 9 illustrates a flowchart of a series of acts for generating performance metrics for a critical transportation provider situation in accordance with one or more embodiments.

FIGS. 1-8, the corresponding text and the examples provide a number of different methods, systems, devices, and non-transitory computer-readable media of the critical situation performance system 106. In addition to the foregoing, one or more embodiments can also be described in terms of flowcharts comprising acts for accomplishing particular results, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating performance metrics for a critical transportation provider situation in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. For example, in some embodiments, the acts of FIG. 9 can be performed as part of a computer-implemented method. Alternatively, a non-transitory computer-readable medium can store instructions thereon that, when executed by at least one processor, cause a computing device to perform the acts of FIG. 9. In some embodiments, a system can perform the acts of FIG. 9. For example, in one or more embodiments, a system includes at least one processor. The system can further include a non-transitory computer-readable medium comprising instructions that, when executed by the at least one processor, cause the system to perform the acts of FIG. 9.

The series of acts 900 includes an act 902 of simulating initialized transportation provider situations. For example, the act 902 can involve simulating a set of initialized transportation provider situations propagated through time to determine risk metrics corresponding to the set of initialized transportation provider situations. In one or more embodiments, simulating the set of initialized transportation provider situations propagated through time comprises, for an initialized transportation provider situation: propagating the initialized transportation provider situation through time; detecting a simulated environment degradation event; and terminating simulation of the initialized transportation provider situation based on detecting the simulated environment degradation event.

The series of acts 900 also includes an act 904 of determining critical transportation provider performance scenarios from the initialized transportation provider situations. For example, the act 904 can involve determining critical transportation provider performance scenarios by comparing the risk metrics corresponding to the set of initialized transportation provider situations to a risk threshold. In one or more embodiments, determining the critical transportation provider performance scenarios by comparing the risk metrics corresponding to the set of initialized transportation provider situations to the risk threshold comprises, for an initialized transportation provider situation propagated through time, identifying a portion of the initialized transportation provider situation propagated through time that occurs before a risk metric corresponding to the initialized transportation provider situation crosses the risk threshold.

Additionally, the series of acts 900 includes an act 906 of clustering the critical transportation provider performance scenarios. For example, the act 906 can involve utilizing a clustering algorithm to group the critical transportation provider performance scenarios into critical situation clusters. In some implementations, utilizing the clustering algorithm to group the critical transportation provider performance scenarios into the critical situation clusters comprises: determining simulated environment condition features corresponding to the portion of the initialized transportation provider situation propagated through time at a time step when the risk metric corresponding to the initialized transportation provider situation crosses the risk threshold; and utilizing the clustering algorithm to group the critical transportation provider performance scenarios into the critical situation clusters based on the simulated environment condition features.

Further, the series of acts 900 includes an act 908 of sampling a critical transportation provider situation from the clusters. More particularly, the act 908 can involve sampling a critical transportation provider situation from the critical situation clusters. In some implementations, the critical situation performance system 106, for a critical situation cluster, determines a probability for the critical situation cluster based on a rate of occurrence when simulating the set of initialized transportation provider situations propagated through time. Accordingly, the critical situation performance system 106 can sample the critical transportation provider situation from the critical situation clusters by sampling the critical transportation provider situation based on the determined probability.

The series of acts 900 also includes an act 910 of generating performance metrics for the critical transportation provider situation. For example, the act 910 can involve utilizing a simulation model to generate one or more performance metrics for the critical transportation provider situation by propagating the critical transportation provider situation through time. In some embodiments, utilizing the simulation model to generate the one or more performance metrics for the critical transportation provider situation comprises utilizing the simulation model to generate at least one of a transportation throughput metric or a transportation utilization metric.

In one or more embodiments, the critical situation performance system utilizes one simulation model to simulate the set of initialized transportation provider situations propagated through time and another simulation model to generate the one or more performance metrics. Indeed, in some instances, simulating the set of initialized transportation provider situations propagated through time comprises utilizing an additional simulation model to simulate the set of initialized transportation provider situations propagated through time, wherein the additional simulation model is different than the simulation model utilized to generate the one or more performance metrics. In some implementations, utilizing the additional simulation model to simulate the set of initialized transportation provider situations propagated through time comprises utilizing a Gaussian random walk model to direct a behavior of a set of simulated transportation providers through time; and utilizing the simulation model to generate the one or more performance metrics for the critical transportation provider situation by propagating the critical transportation provider situation through time comprises utilizing a directive-based model to direct the behavior of the set of simulated transportation providers through time.

In one or more embodiments, the series of acts 900 further includes acts for modifying the directive-based model. For example, in one or more embodiments, the acts include modifying hyperparameters of the directive-based model based on the one or more performance metrics for the critical transportation provider situation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
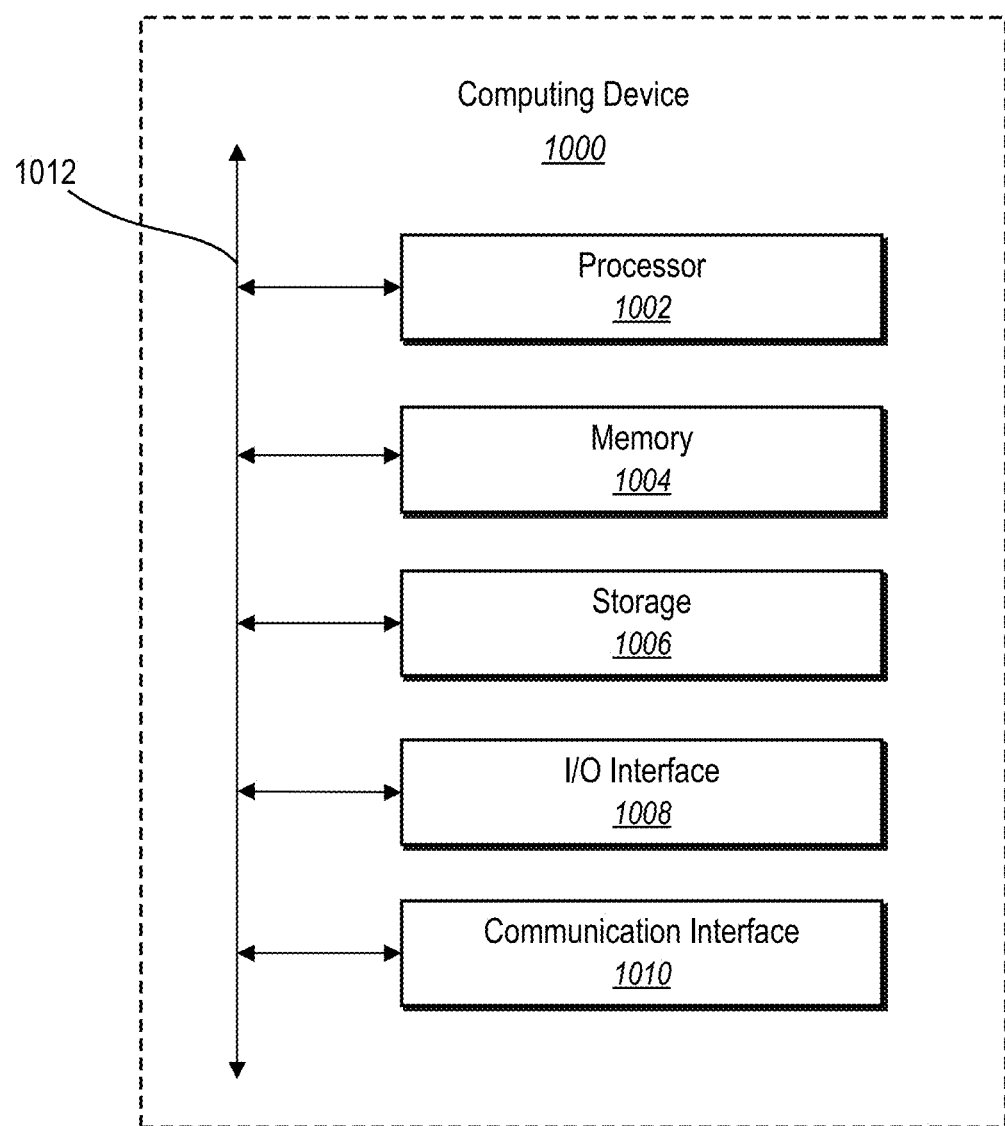
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102 and/or the client device 110). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

Figure 11:
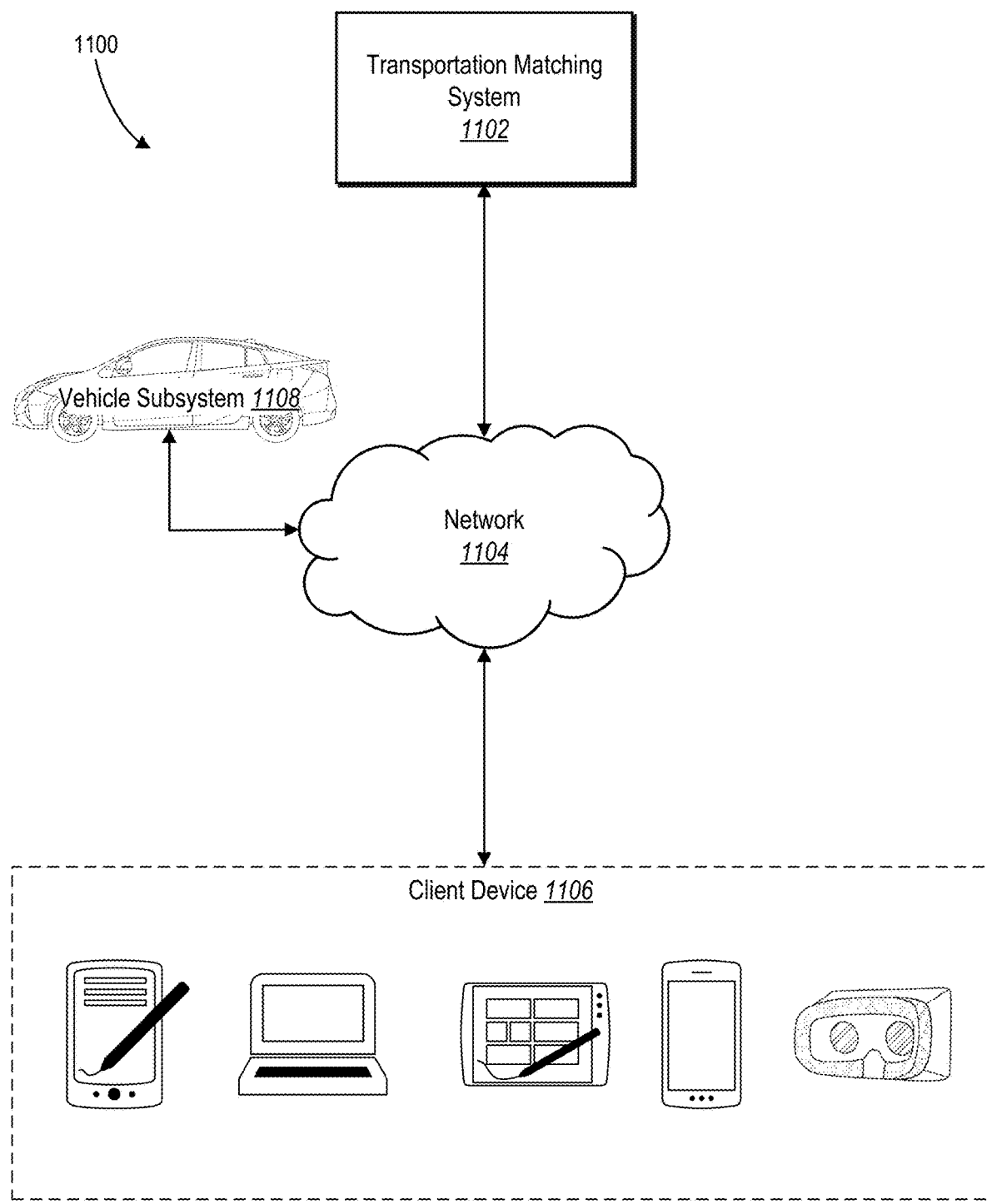
FIG. 11 illustrates an example environment for a transportation matching system in accordance with one or more embodiments.

FIG. 11 illustrates an example network environment 1100 of a transportation matching system 1102. The network environment 1100 includes a client device 1106, a transportation matching system 1102, and a vehicle subsystem 1108 connected to each other by a network 1104. Although FIG. 11 illustrates a particular arrangement of the client device 1106, transportation matching system 1102, vehicle subsystem 1108, and network 1104, this disclosure contemplates any suitable arrangement of client device 1106, transportation matching system 1102, vehicle subsystem 1108, and network 1104. As an example, and not by way of limitation, two or more of client device 1106, transportation matching system 1102, and vehicle subsystem 1108 communicate directly, bypassing network 1104. As another example, two or more of client device 1106, transportation matching system 1102, and vehicle subsystem 1108 may be physically or logically co-located with each other in whole or in part. Moreover, although FIG. 11 illustrates a particular number of client devices 1106, transportation matching systems 1102, vehicle subsystems 1108, and networks 1104, this disclosure contemplates any suitable number of client devices 1106, transportation matching systems 1102, vehicle subsystems 1108, and networks 1104. As an example, and not by way of limitation, network environment 1100 may include multiple client device 1106, transportation matching systems 1102, vehicle subsystems 1108, and networks 1104.

This disclosure contemplates any suitable network 1104. As an example, and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106, transportation matching system 1102, and vehicle subsystem 1108 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client device 1106 may be an electronic device including hardware, software, or embedded logic components or a combination of two or more such components and capable of carrying out the appropriate functionalities implemented or supported by client device 1106. As an example, and not by way of limitation, a client device 1106 may include any of the computing devices discussed above in relation to FIG. 10. A client device 1106 may enable a network user at client device 1106 to access network 1104. A client device 1106 may enable its user to communicate with other users at other client devices 1106.

In particular embodiments, client device 1106 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1106 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 1106 one or more Hyper Text Markup Language ("HTML") files responsive to the HTTP request. Client device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 1102 may be a network-addressable computing system that can host a transportation matching network. Transportation matching system 1102 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 1102. In addition, the transportation matching system may manage identities of service requesters such as users/requesters. In particular, the transportation matching system 1102 may maintain requester data such as driving/riding histories, personal data, or other user data in addition to navigation and/or traffic management services or other location services (e.g., GPS services).

In particular embodiments, the transportation matching system 1102 may manage transportation matching services to connect a user/requester with a vehicle and/or provider. By managing the transportation matching services, the transportation matching system 1102 can manage the distribution and allocation of resources from the vehicle subsystem 1108 and user resources such as GPS location and availability indicators, as described herein.

Transportation matching system 1102 may be accessed by the other components of network environment 1100 either directly or via network 1104. In particular embodiments, transportation matching system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation matching system 1102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, or a transportation matching system 1102 to manage, retrieve, modify, add, or delete, the information stored in data store.

In particular embodiments, transportation matching system 1102 may provide users with the ability to take actions on various types of items or objects, supported by transportation matching system 1102. As an example, and not by way of limitation, the items and objects may include transportation matching networks to which users of transportation matching system 1102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in transportation matching system 1102 or by an external system of a third-party system, which is separate from transportation matching system 1102 and coupled to transportation matching system 1102 via a network 1104.

In particular embodiments, transportation matching system 1102 may be capable of linking a variety of entities. As an example, and not by way of limitation, transportation matching system 1102 may enable users to interact with each other or other entities, or to allow users to interact with these entities through an application programming interfaces ("API") or other communication channels.

In particular embodiments, transportation matching system 1102 may include a variety of servers, sub-systems, programs, modules, logs, and data stores. In particular embodiments, transportation matching system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation matching system 1102 may also include suitable components such as network interfaces, security mechanisms, load balancers, failover servers, management-and-network-operations consoles, other suitable components, or any suitable combination thereof. In particular embodiments, transportation matching system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation matching system 1102 and one or more client devices 1106. An action logger may be used to receive communications from a web server about a user's actions on or off transportation matching system 1102. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of transportation matching system 1102. A privacy setting of a user determines how particular information associated with a user can be shared. The authorization server may allow users to opt in to or opt out of having their actions logged by transportation matching system 1102 or shared with other systems, such as, for example, by setting appropriate privacy settings. Third-party-content-object stores may be used to store content objects received from third parties. Location stores may be used for storing location information received from client devices 1106 associated with users.

In addition, the vehicle subsystem 1108 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1108 can include an autonomous vehicle—i.e., a vehicle that does not require a human operator. In these embodiments, the vehicle subsystem 1108 can perform maneuvers, communicate, and otherwise function without the aid of a human provider, in accordance with available technology.

In particular embodiments, the vehicle subsystem 1108 may include one or more sensors incorporated therein or associated thereto. For example, sensor(s) can be mounted on the top of the vehicle subsystem 1108 or else can be located within the interior of the vehicle subsystem 1108. In certain embodiments, the sensor(s) can be located in multiple areas at once—i.e., split up throughout the vehicle subsystem 1108 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1108 may include a communication device capable of communicating with the client device 1106 and/or the transportation matching system 1102. For example, the vehicle subsystem 1108 can include an on-board computing device communicatively linked to the network 1104 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   running a first set of simulations to identify a set of critical transportation provider performance scenarios by:
   generating a set of transportation provider performance scenarios by propagating a set of initialized transportation provider situations through time to determine risk metrics corresponding to the set of initialized transportation provider situations;
   determining, from the set of transportation provider performance scenarios, a set of critical transportation provider performance scenarios that are associated with at least a particular level of risk of failing to provide transportation matching services at a determined minimum level of effectiveness by comparing the risk metrics determined from the first set of simulations to a risk threshold;
   utilizing a clustering algorithm to group the set of critical transportation provider performance scenarios into critical situation clusters; and
   sampling a critical transportation provider situation from the critical situation clusters, the critical transportation provider situation comprising a snapshot of a corresponding critical transportation provider performance scenario;
   running a second set of simulations on the critical transportation provider situation to measure a performance of a dispatch model by:
   generating, utilizing a simulation model comprising a dispatch model that at least partially directs behaviors of simulated transportation providers, a simulation by propagating the critical transportation provider situation through time to measure a performance of the dispatch model by generating one or more performance metrics for the dispatch model with respect to the critical transportation provider situation;

providing, for display within a graphical user interface of a client device, one or more visual elements corresponding to the one or more performance metrics for the dispatch model and a selectable option within the graphical user interface for modifying one or more hyperparameters of the dispatch model;

modifying, in response to detecting a user interaction selecting the selectable option via the graphical user interface of the client device, the one or more hyperparameters of the dispatch model;

determining a comparison between a first performance of the dispatch model and a second performance of the dispatch model having the one or more modified hyperparameters with respect to the critical transportation provider situation; and modifying the graphical user interface of the client device to provide, for display, one or more additional visual elements representing the comparison between the first performance and the second performance.

2. The computer-implemented method of claim 1, wherein generating the set of transportation provider performance scenarios via the first set of simulations by propagating the set of initialized transportation provider situations through time comprises utilizing an additional simulation model to simulate the set of initialized transportation provider situations propagated through time, wherein the additional simulation model is different than the simulation model utilized to generate the one or more performance metrics.

3. The computer-implemented method of claim 2, wherein:

utilizing the additional simulation model to simulate the set of initialized transportation provider situations propagated through time comprises utilizing a Gaussian random walk model to direct a behavior of a set of simulated transportation providers through time; and generating, utilizing the simulation model comprising the dispatch model, the simulation by propagating the critical transportation provider situation through time to measure the performance of the dispatch model by generating the one or more performance metrics for the dispatch model with respect to the critical transportation provider situation comprises utilizing the simulation model comprising a directive-based model to direct the behavior of the set of simulated transportation providers through time.

4. The computer-implemented method of claim 1, further comprising generating, utilizing the simulation model comprising the dispatch model with the one or more modified hyperparameters, an additional simulation model by propagating the critical transportation provider situation or another critical transportation provider situation through time to generate one or more additional performance metrics for the dispatch model having the one or more modified hyperparameters.

5. The computer-implemented method of claim 1, wherein generating the set of transportation provider performance scenarios via the first set of simulations by propagating the set of initialized transportation provider situations through time comprises, for an initialized transportation provider situation:

propagating the initialized transportation provider situation through time;

detecting a simulated environment degradation event; and terminating simulation of the initialized transportation provider situation based on detecting the simulated environment degradation event.

6. The computer-implemented method of claim 1, wherein determining the set of critical transportation provider performance scenarios from the set of transportation provider performance scenarios by comparing the risk metrics determined from the first set of simulations to the risk threshold comprises, for an initialized transportation provider situation propagated through time, identifying a portion of the initialized transportation provider situation propagated through time that occurs before a risk metric corresponding to the initialized transportation provider situation crosses the risk threshold.

7. The computer-implemented method of claim 6, wherein utilizing the clustering algorithm to group the set of critical transportation provider performance scenarios into the critical situation clusters comprises:

determining simulated environment condition features corresponding to the portion of the initialized transportation provider situation propagated through time at a time step when the risk metric corresponding to the initialized transportation provider situation crosses the risk threshold; and utilizing the clustering algorithm to group the set of critical transportation provider performance scenarios into the critical situation clusters based on the simulated environment condition features.

8. The computer-implemented method of claim 1, further comprising, for a critical situation cluster, determining a probability for the critical situation cluster based on a rate of occurrence when simulating the set of initialized transportation provider situations propagated through time, wherein sampling the critical transportation provider situation from the critical situation clusters comprises sampling the critical transportation provider situation based on the determined probability.

9. The computer-implemented method of claim 1, wherein each transportation provider performance scenario from the set of transportation provider performance scenarios indicates an evolution of a simulated environment augmented with behavioral parameters of actions of simulated transportation providers and simulated transportation requesters via propagation of an initialized transportation provider situation from the set of initialized transportation provider situations through time.

10. A non-transitory computer-readable medium storing instructions thereon that, when executed by at least one processor, cause a computing device to:

run a first set of simulations to identify a set of critical transportation provider performance scenarios by:

generating a set of transportation provider performance scenarios by propagating a set of initialized transportation provider situations through time to determine risk metrics corresponding to the set of initialized transportation provider situations;

determining, from the set of transportation provider performance scenarios, a set of critical transportation provider performance scenarios that are associated with at least a particular level of risk of failing to provide transportation matching services at a determined minimum level of effectiveness by comparing the risk metrics determined from the first set of simulations to a risk threshold;

utilizing a clustering algorithm to group the set of critical transportation provider performance scenarios into critical situation clusters; and sampling a critical transportation provider situation from the critical situation clusters, the critical transportation provider situation comprising a snapshot of a corresponding critical transportation provider performance scenario;

run a second set of simulations on the critical transportation provider situation to measure a performance of a dispatch model by:

generating, utilizing a simulation model comprising a dispatch model that at least partially directs behaviors of simulated transportation providers, a simulation by propagating the critical transportation provider situation through time to measure a performance of the dispatch model by generating one or more performance metrics for the dispatch model with respect to the critical transportation provider situation;

provide, for display within a graphical user interface of a client device, one or more visual elements corresponding to the one or more performance metrics for the dispatch model and a selectable option within the graphical user interface for modifying one or more hyperparameters of the dispatch model; and modify, in response to detecting a interaction selecting the selectable option via the graphical user interface of the client device, the one or more hyperparameters of the dispatch model;

determine a comparison between a first performance of the dispatch model and a second performance of the dispatch model having the one or more modified hyperparameters with respect to the critical transportation provider situation; and modify the graphical user interface of the client device to provide, for display, one or more additional visual elements representing the comparison between the first performance and the second performance.

11. The non-transitory computer-readable medium of claim 10, further comprising instructions that, when executed by the at least one processor, cause the computing device to generate the set of transportation provider performance scenarios via the first set of simulations by propagating the set of initialized transportation provider situations through time by utilizing an additional simulation model to simulate the set of initialized transportation provider situations propagated through time, wherein the additional simulation model is different than the simulation model utilized to generate the one or more performance metrics.

12. The non-transitory computer-readable medium of claim 11,
wherein utilizing the additional simulation model to simulate the set of initialized transportation provider situations propagated through time comprises utilizing a Gaussian random walk model to direct a behavior of a set of simulated transportation providers through time; and further comprising instructions that, when executed by the at least one processor, cause the computing device to generate, utilizing the simulation model comprising the dispatch model, the simulation by propagating the critical transportation provider situation through time to measure the performance of the dispatch model by generating the one or more performance metrics for the dispatch model with respect to the critical transportation provider situation by utilizing the simulation model comprising a directive-based model to direct the behavior of the set of simulated transportation providers through time.

13. The non-transitory computer-readable medium of claim 10, further comprising instructions that, when executed by the at least one processor, cause the computing device to generate, utilizing the simulation model comprising the dispatch model with the one or more modified hyperparameters, an additional simulation model by propagating the critical transportation provider situation or another critical transportation provider situation through time to generate one or more additional performance metrics for the dispatch model having the one or more modified hyperparameters.

14. The non-transitory computer-readable medium of claim 10, further comprising instructions that, when executed by the at least one processor, cause the computing device to generate the set of transportation provider performance scenarios via the first set of simulations by propagating the set of initialized transportation provider situations through time by, for an initialized transportation provider situation:

propagating the initialized transportation provider situation through time;

detecting a simulated environment degradation event; and terminating simulation of the initialized transportation provider situation based on detecting the simulated environment degradation event.

15. The non-transitory computer-readable medium of claim 10, further comprising instructions that, when executed by the at least one processor, cause the computing device to determine the set of critical transportation provider performance scenarios from the set of transportation provider performance scenarios by comparing the risk metrics determined from the first set of simulations to the risk threshold by, for an initialized transportation provider situation propagated through time, identifying a portion of the initialized transportation provider situation propagated through time that occurs before a risk metric corresponding to the initialized transportation provider situation crosses the risk threshold.

16. The non-transitory computer-readable medium of claim 15, further comprising instructions that, when executed by the at least one processor, cause the computing device to utilize the clustering algorithm to group the set of critical transportation provider performance scenarios into the critical situation clusters by:

determining simulated environment condition features corresponding to the portion of the initialized transportation provider situation propagated through time at a time step when the risk metric corresponding to the initialized transportation provider situation crosses the risk threshold; and utilizing the clustering algorithm to group the set of critical transportation provider performance scenarios into the critical situation clusters based on the simulated environment condition features.

17. The non-transitory computer-readable medium of claim 10, further comprising instructions that, when executed by the at least one processor, cause the computing device to:

for a critical situation cluster, determine a probability for the critical situation cluster based on a rate of occurrence when simulating the set of initialized transportation provider situations propagated through time; and sample the critical transportation provider situation from the critical situation clusters by sampling the critical transportation provider situation based on the determined probability.

18. A system comprising:

at least one processor; and a non-transitory computer-readable medium comprising instructions that, when executed by the at least one processor, cause the system to:

run a first set of simulations to identify a set of critical transportation provider performance scenarios by:

generating a set of transportation provider performance scenarios by propagating a set of initialized transportation provider situations through time to determine risk metrics corresponding to the set of initialized transportation provider situations;

determining, from the set of transportation provider performance scenarios, a set of critical transportation provider performance scenarios that are associated with at least a particular level of risk of failing to provide transportation matching services at a determined minimum level of effectiveness by comparing the risk metrics determined from the first set of simulations to a risk threshold;

utilizing a clustering algorithm to group the set of critical transportation provider performance scenarios into critical situation clusters; and sampling a critical transportation provider situation from the critical situation clusters, the critical transportation provider situation comprising a snapshot of a corresponding critical transportation provider performance scenario;

run a second set of simulations on the critical transportation provider situation to measure a performance of a dispatch model by:

generating, utilizing a simulation model comprising a dispatch model that at least partially directs behaviors of simulated transportation providers, a simulation by propagating the critical transportation provider situation through time to measure a performance of the dispatch model by generating one or more performance metrics for the dispatch model with respect to the critical transportation provider situation;

provide, for display within a graphical user interface of a client device, one or more visual elements corresponding to the one or more performance metrics for the dispatch model and a selectable option within the graphical user interface for modifying one or more hyperparameters of the dispatch model;

modify, in response to detecting a user interaction selecting the selectable option via the graphical user interface of the client device, the one or more hyperparameters of the dispatch model;

determine a comparison between a first performance of the dispatch model and a second performance of the dispatch model having the one or more modified hyperparameters with respect to the critical transportation provider situation; and modify the graphical user interface of the client device to provide, for display, one or more additional visual elements representing the comparison between the first performance and the second performance.

19. The system of claim 18, further comprising instructions that, when executed by the at least one processor, cause the system to generate the set of transportation provider performance scenarios via the first set of simulations by propagating the set of initialized transportation provider situations through time by utilizing an additional simulation model to simulate the set of initialized transportation provider situations propagated through time, wherein the additional simulation model is different than the simulation model utilized to generate the one or more performance metrics.

20. The system of claim 19, wherein utilizing the additional simulation model to simulate the set of initialized transportation provider situations propagated through time comprises utilizing a Gaussian random walk model to direct a behavior of a set of simulated transportation providers through time; and further comprising instructions that, when executed by the at least one processor, cause the system to generate, utilizing the simulation model comprising the dispatch model, the simulation by propagating the critical transportation provider situation through time to measure the performance of the dispatch model by generating the one or more performance metrics for the dispatch model with respect to the critical transportation provider situation by utilizing a directive-based model to direct the behavior of the set of simulated transportation providers through time.

* * * * *